(12) United States Patent
Tajima

(10) Patent No.: US 6,477,039 B2
(45) Date of Patent: *Nov. 5, 2002

(54) IMAGE DISPLAY DEVICE

(75) Inventor: Hisao Tajima, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/511,767

(22) Filed: Feb. 24, 2000

(65) Prior Publication Data
US 2002/0067591 A1 Jun. 6, 2002

(30) Foreign Application Priority Data

Feb. 24, 1999 (JP) .............................. 11-047091
Mar. 5, 1999 (JP) .............................. 11-058460

(51) Int. Cl.⁷ .................................................. H01J 1/30
(52) U.S. Cl. ........................ 361/681; 361/688; 248/611; 345/60
(58) Field of Search ........................ 361/681, 684–688, 361/815, 818–819; 439/152–160; 248/60, 581, 609, 611, 615, 634, 635, 638; 364/708.1; 345/60

(56) References Cited

U.S. PATENT DOCUMENTS

| 4,734,359 A | * | 3/1988 | Oguchi et al. ............... 430/495 |
| 4,771,559 A | * | 9/1988 | Keithley ...................... 40/603 |
| 4,814,759 A | * | 3/1989 | Gombrich et al. .......... 340/771 |
| 5,856,819 A | | 1/1999 | Vossler ....................... 345/102 |
| 6,124,837 A | * | 9/2000 | Usuki et al. ................. 340/980 |

FOREIGN PATENT DOCUMENTS

| EP | 0 545 115 | 6/1993 |
| JP | 7-23525 | 1/1995 |
| JP | 10-013765 | 1/1998 |
| JP | 10-117079 | 5/1998 |
| JP | 11-018022 | 1/1999 |
| KR | 1991-8537 | 5/1991 |
| KR | 1998-18794 | 7/1998 |
| WO | WO97/34313 | 9/1997 |

* cited by examiner

Primary Examiner—Darren Schuberg
Assistant Examiner—Hung Van Duong
(74) Attorney, Agent, or Firm—Fitzpatrick, Cella, Harper & Scinto

(57) ABSTRACT

An image display device includes a display panel, and a housing that includes a frame body arranged on the circumference of the display panel and a back cover arranged on the back of the display panel. The frame body has a structure for sandwiching therein the display panel.

57 Claims, 14 Drawing Sheets

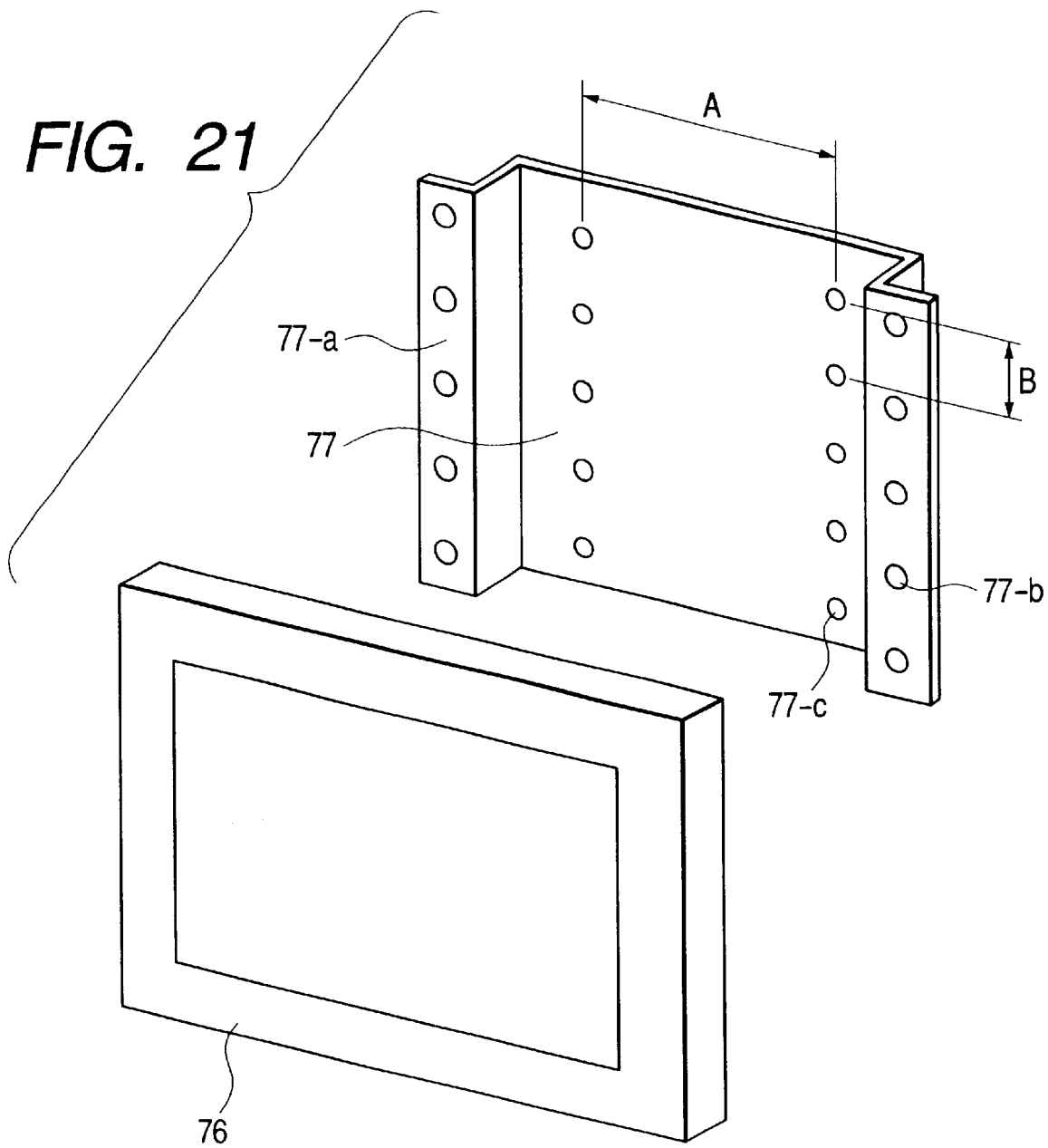

IMAGE DISPLAY DEVICE

BACKGROUND OF THE INVENTION

1. Field of the Invention

The present invention relates to an image display device, particularly to a housing structure of the same.

2. Related Background Art

Thin planar image display devices are used for television sets, computer terminals, advertising medium, signs, etc. Examples of the thin planar image display devices include a display device using an electron-emitting device, a display device utilizing plasma discharge, a display device using liquid crystal, and a display device using a fluorescent display tube. What has attracted attention in recent years is a wall-hung television set having a screen of size 40 or larger, which makes use of characteristics of the thin planar image display devices. The basic structure of those devices comprises a display panel, an electric circuit unit, structural members for supporting the above two, and an exterior member (cover).

A mount structure for PDP (Japanese Patent Application Laid-Open No. 10-013765) exemplifies a prior art related to the present invention.

FIG. 19 is a sectional view showing a conventional thin planar image display device PDP (plasma display panel). A PDP unit 62 is housed in a housing of the display device which comprises a front frame (front cover) 60 and a back cover 61, so that a television image, or the like, displayed on the front face of the PDP 62 unit can be seen from a window opened in a front face 60-b of the front frame. A back portion 63-a of an attachment frame 63 made of sheet metal or the like is fixedly attached with a vis screw 64-c to a boss 62-a standing behind the PDP unit 62. Two sides of the attachment frame 63 on the left and right are bent to form a side face portion 63-b. The front of the side face portion 63-b is bent so as to be in parallel with the front face of the PDP unit and the bent portion forms a front face portion 63-c. The front face portion 63-c is screwed with a vis screw 64-a onto a boss 60-a standing inside the front frame 60 of the display device. In this way, the PDP unit 62 can be held onto the front frame 60. The side face portion 63-b of the attachment frame 63 is partially cut and pulled up to form a cut-and-pull-up portion 63-e is bent parallel to the PDP unit to form a back cover attaching portion 63-d. The back cover 61 is attached to the back cover attaching portion 63-d with a vis screw 64-b, to thereby construct a rear part of the housing of the display device.

Another conventional example is a fan fitting structure for electronic apparatus (Japanese Patent Application Laid-Open No. 10-117079). FIG. 20 is a sectional view of a conventional thin planar image display device PDP (plasma display panel). A PDP unit 71 with a driving substrate 71-a attached to its back is fixed to a chassis 72 having a plurality of ventholes 72-a. A housing 73 having intake holes 73-a on its bottom and side faces and exhaust holes 73-b on its top face is fixed to the external of the chassis 72. On the top face of the chassis 72, ventholes 72-b corresponding to the exhaust holes 73-b are formed. An attachment frame 74, which projects outwardly while its side section is fanning out, is fixed to the circumference of the ventholes 72-b, and an axial fan 75 is attached to the attachment frame 74.

FIG. 21 shows a fitting used in attaching a conventional thin planar image display device to the wall. In the drawing, reference symbol 76 denotes a PDP device and 77 denotes a wall-hanging means. Denoted by 77-a is a portion where the wall-hanging means comes in contact with the back of the device unit 76, and 77-b are plurality of holes for screwing the wall-hanging means 77 onto the PDP device 76 with a screw (not shown). The holes 77-c have already been finished before this product is on the market, so that the hole pitches A and B shown in the drawing cannot be changed after the purchase.

As described above, the structure of a conventional thin planar image display device comprises a housing (a front cover and a back cover) housing a display panel (PDP, or the like), a substrate, i.e., an electric circuit unit, and frames or chassis that are structural members for supporting the panel and the circuit, and a fan for cooling its interior. Further, the device also has on its back an attaching portion dedicated to a wall-hanging means. However, those conventional thin planar image display devices have room for improvement as follows.

1. When using the device for a wall-hung television set, thinner housing structure is desirable. To manufacture an extremely thin television is, however, difficult, for the device has structural members (frames) for supporting the display panel and a clearance is required to send the air for cooling.

2. Sound of the television in watching the television in a quiet room is interrupted by the noise caused when the fan rotates and the air flows inside the device.

3. In the case of manufacturing in a large scale many kinds of television which vary in screen size, for example, televisions of size 40, size 50, and size 60, investment for mold of housing parts (including a front frame and a back cover) used therefor is significant. In addition, equipment such as a large molding machine and a press machine is also required.

4. Any thin hang-wall television set weighs several tens Kg, so that it has to be screwed with a screw onto a portion of the wall which has enough strength inside. However, if the position of holes in wall-hanging means of the product is not suited, a purchaser is forced to try other walls or give up hanging the television on the wall and placing it on the floor, often leading to complaints by the purchaser.

SUMMARY OF THE INVENTION

An object of the present invention is to provide a structure for supporting a display panel of an image display device, or a structure for supporting a display panel and an electric circuit unit.

Another object of the present invention is to provide a cooling structure for a heat generating portion and a structure for hanging the device on the wall, in addition to the above supporting structure.

According to the present invention, there is provided an image display device comprising: a display panel; and a housing that includes a frame body arranged on the circumference of the display panel and a back cover arranged on the back of the display panel, characterized in that the frame body has a structure for holding therein the display panel.

According to the present invention, there is provided an image display device comprising: a display panel; and a housing that includes a frame body arranged on the circumference of the display panel and a back cover arranged on the back of the display panel, characterized in that the frame body has a surface covering portion for partially covering the surface of the display panel, and a supporting portion for supporting the display panel.

According to the present invention, there is provided an image display device comprising: a display panel; and a housing that includes a frame body arranged on the circumference of the display panel and a back cover arranged on the back of the display panel, characterized in that the frame body has a space therein where a drive controlling electric circuit unit is arranged.

According to the present invention, there is provided an image display device comprising a display panel and a housing covering the circumference and the back of the display panel, characterized in that the housing has a linear groove or a linear convex.

According to the present invention, there is provided an image display device having a supporting frame that is placed along the circumference of a display panel and resembles a picture frame, characterized in that the supporting frame has a hollow frame for supporting the perimeter of the display panel, and wherein a drive controlling electric circuit unit for the display device is provided inside the hollow frame.

BRIEF DESCRIPTION OF THE DRAWINGS

FIG. 21 is an external view of wall-hanging means of a PDP in the prior art.

DESCRIPTION OF THE PREFERRED EMBODIMENTS

Figure 1:
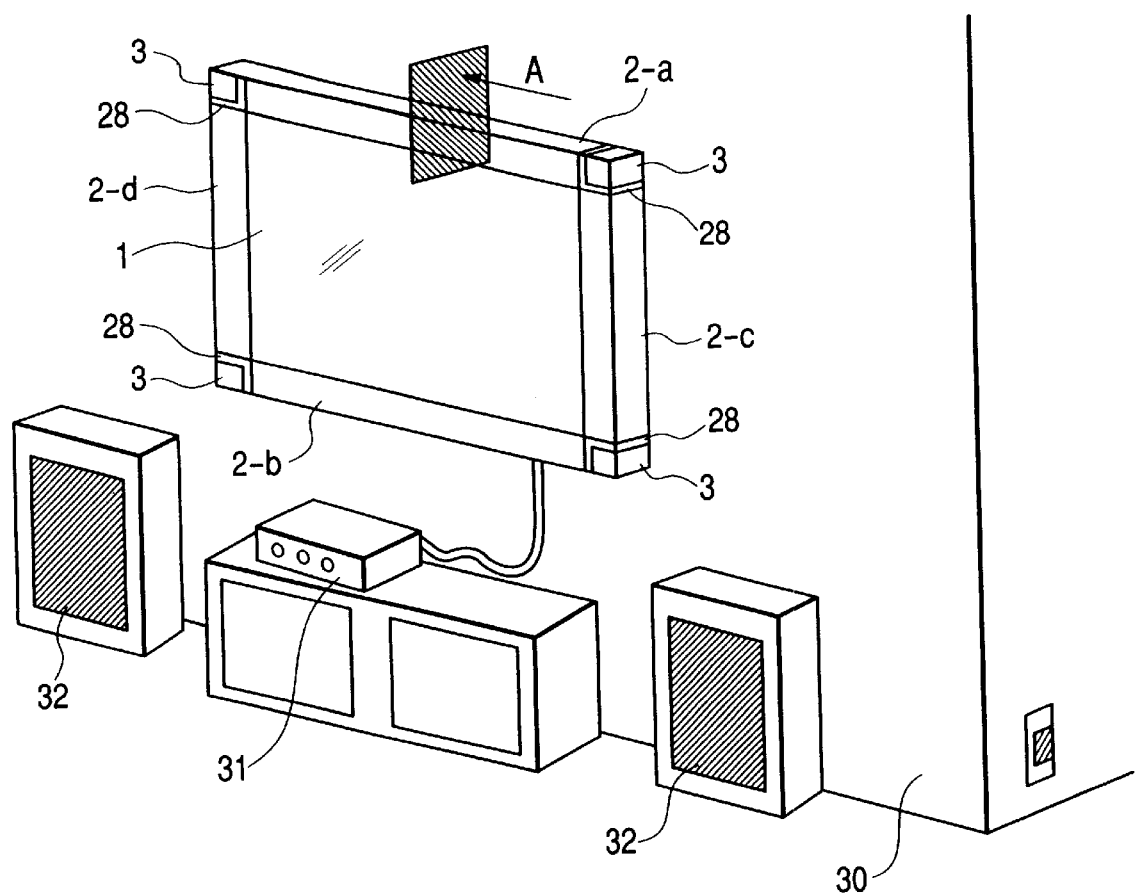
FIG. 1 is an external view illustrating the features of a first embodiment in accordance with the present invention.

An image display device according to a first aspect of the present is comprised of: a display panel; and a housing that includes a frame body arranged on the circumference of the display panel and a back cover arranged on the back of the display panel, and is characterized in that the frame body has a structure for holding therein the display panel.

Further, an image display device of the first aspect of the present invention is characterized in that the frame body has a structure in which a plurality of members combined are used to hold the display panel.

Still further, an image display device of the first aspect of the present invention is characterized in that the frame body is comprised of members that are integrated and have a clearance portion for holding the display panel.

Yet further, an image display device of the first aspect of the present invention is characterized in that the holding portion of the frame body has an elastic member arranged therein.

Yet still further, an image display device of the first aspect of the present invention is characterized in that the holding portion of the frame body has an elastic member and a groove for positioning the elastic member.

Furthermore, an image display device of the first aspect of the present invention is characterized in that the elastic member has level difference for positioning the display panel.

An image display device according to a second aspect of the present invention is comprised of: a display panel; and a housing that includes a frame body arranged on the circumference of the display panel and a back cover arranged on the back of the display panel, and is characterized in that the frame body has a surface covering portion for partially covering the surface of the display panel, and a supporting portion for supporting the display panel.

Further, an image display device of the second aspect of the present invention is characterized in that the frame body constructed of a combination of a plurality of members including a member that forms the surface covering portion and a member forming the supporting portion.

Still further, an image display device of the second aspect of the present invention is characterized in that the supporting portion has an adhesion member, which is used to support the display panel.

Yet further, an image display device of the second aspect of the present invention is characterized in that the supporting portion has a groove for positioning the adhesion member.

An image display device according to a third aspect of the present invention is comprised of: a display panel; and a housing that includes a frame body arranged on the circumference of the display panel and a back cover arranged on the back of the display panel, and is characterized in that wherein the frame body has a space therein where a drive controlling electric circuit unit is arranged.

Further, an image display device of the third aspect of the present invention is characterized in that the drive controlling electric circuit unit is connected to another drive controlling electric circuit unit that is arranged outside the space.

Still further, an image display device of the third aspect of the present invention is characterized in that the frame body has a heat releasing means on its outside.

Yet further, an image display device of the third aspect of the present invention is characterized in that the frame body has a heat absorbing means on the inner walls of the space.

Yet still further, an image display device of the third aspect of the present invention is characterized in that the heat absorbing means is arranged in close contact with the drive controlling electric circuit unit.

Furthermore, an image display device of the third aspect of the present invention is characterized in that a heat conductive member is placed between the heat absorbing means and the drive controlling electric circuit unit.

Still furthermore, an image display device of the third aspect of the present invention is characterized in that the drive controlling electric circuit unit is comprised of a circuit substrate, a cable and an electric device.

Yet furthermore, an image display device of the third aspect of the present invention is characterized in that the inner walls of the frame body have a groove for positioning the circuit substrate.

Moreover, an image display device of the third aspect of the present invention is characterized in that an insulating member is placed between the inner walls of the frame and the circuit substrate.

An image display device according to a fourth aspect of the present invention is comprised of a display panel and a housing covering the circumference and the back of the display panel, and is characterized in that a linear groove or a linear convex is formed in the housing.

Further, an image display device of the fourth aspect of the present invention is characterized in that the groove or the convex is formed on a side wall portion or the back portion of the housing.

Still further, an image display device of the fourth aspect of the present invention is characterized in that the housing has a frame body arranged on the circumference of the display panel and a back cover arranged on the back of the display panel, and in that the groove or the convex is formed on the frame body.

Further, an image display device according to any of the above first to fourth aspects of the present invention is characterized in that:

the inner wall surfaces of the frame body are curved;

the frame body has means for fixing the back cover;

the frame body is made of an aluminum alloy or a magnesium alloy;

the surface of the frame body is treated with an oxidation preventing treatment;

members forming four sides of the frame body are molded by an extrusion machining; or the display panel has a plurality of surface conduction type electron-emitting devices therein.

An image display device according to a fifth aspect of the present invention has a supporting frame that is placed along the circumference of a display panel and resembles a picture frame, and is characterized in that the supporting frame has a hollow frame for supporting the perimeter of the display panel, and a drive controlling electric circuit unit for the display device is provided inside the hollow frame.

Further, an image display device of the fifth aspect of the present invention is characterized in that the hollow frame includes an outer frame and an inner frame, which may be placed at the front and the back of the perimeter of the display panel, respectively.

Still further, an image display device of the fifth aspect of the present invention is characterized in that the display panel is held and fixed by the outer frame and the inner frame at the front and the back of its perimeter.

Yet further, an image display device of the fifth aspect of the present invention is characterized in that the display panel is adhered and fixed to the inner frame at the back of its perimeter.

Yet still further, an image display device of the fifth aspect of the present invention is characterized in that the display panel is held, or adhered and supported through an elastic supporting means.

Furthermore, an image display device of the fifth aspect of the present invention is characterized in that one of the outer frame and the inner frame has a sectional shape approximate to squared U while the other has a sectional shape approximate to letter L, so that the hollow frame has a sectional shape approximate to a rectangle when the outer and inner frames are coupled.

Still furthermore, an image display device of the fifth aspect of the present invention is characterized in that the hollow frame has its hollow portion in a corner in the section thereof.

Yet furthermore, an image display device of the fifth aspect of the present invention is characterized by further comprising: heat absorbing means provided for an internal heat generating member and formed continuously in the longitudinal direction of the supporting frame; and a heat releasing means formed continuously in the same direction as the heat absorbing means.

Moreover, an image display device of the fifth aspect of the present invention is characterized in that the heat absorbing means is constructed of a plurality of projection forms.

Further, an image display device of the fifth aspect of the present invention is characterized in that the heat absorbing means is a thin film the color of which is approximate to black.

Still further, an image display device of the fifth aspect of the present invention is characterized in that the heat releasing means is constructed of a plurality of projection forms or groove forms, or of a combination of those.

Yet further, an image display device of the fifth aspect of the present invention is characterized in that the drive controlling electric circuit unit of the display panel includes a circuit substrate, a cable and a driver device.

Yet still further, an image display device of the fifth aspect of the present invention is characterized in that the hollow frame constituting the support frame in the vicinity of the cable is curved along the cable.

Furthermore, an image display device of the fifth aspect of the present invention is characterized in that the circuit substrate and the driver device mounted thereto are arranged in the vicinity of, or in close contact to the heat absorbing means.

Still furthermore, an image display device of the fifth aspect of the present invention is characterized in that a heat conductive member with elasticity is interposed between the driver device and the heat absorbing means.

Yet furthermore, an image display device of the fifth aspect of the present invention is characterized in that the heat conductive member is made of a material such as aluminum, carbon and graphite.

Moreover, an image display device of the fifth aspect of the present invention is characterized in that the material of the heat conductive member is shaped into a sheet, a film or a filler.

Further, an image display device of the fifth aspect of the present invention is characterized in that an adhesive member is formed and attached on one side of the heat conductive member.

Still further, an image display device of the fifth aspect of the present invention is characterized in that the hollow frame constituting the support frame is molded by extrusion machining, and in that the ends of the hollow frame, which correspond to the ends of the four sides of the picture frame, are joined with one another through other members at the corners of the picture frame.

Yet further, an image display device of the fifth aspect of the present invention is characterized in that the four sides of the hollow frame of the supporting frame are joined with the other members at the corners using screws.

Still further, an image display device of the fifth aspect of the present invention is characterized in that the other members at the corners each form a shape approximate to letter L when viewed from one side of a display panel where an image is to be displayed.

Yet still further, an image display device of the fifth aspect of the present invention is characterized in that the hollow frame constituting the support frame is molded by extrusion machining, and in that the ends of the hollow frame, which correspond to the ends of the four sides of the picture frame, are directly abutted and joined with one another at the corners of the picture frame.

Furthermore, an image display device of the fifth aspect of the present invention is characterized in that the ends of the hollow frame are joined to one another by weld or screws.

Still furthermore, an image display device of the fifth aspect of the present invention is characterized in that a material of the supporting frame is an aluminum alloy or a magnesium alloy.

Yet furthermore, an image display device of the fifth aspect of the present invention is characterized in that the supporting frame is subjected to surface treatment and its entire surface is treated with oxidation preventing treatment.

Moreover, an image display device of the fifth aspect of the present invention is characterized in that the supporting frame is subjected to surface treatment and its exterior surface is coated with a lamination of coating films or plating films.

Further, an image display device of the fifth aspect of the present invention is characterized in that the display panel has surface conduction electron-emitting devices.

According to the present invention described above, the frame body arranged on the circumference of the display panel holds the display panel, reinforcing the display panel against the panel distortion that often accompanies the enlargement of the display panel. Furthermore, giving the frame body a function of supporting the display panel can help to make an even thinner housing. The housing is supported by fixing the frame body itself to installment parts of the display device or to an installment surface such as a wall.

According to the present invention described above, the frame body arranged on the circumference of the display panel has a space therein where a part of the drive controlling electric circuit unit is disposed. This makes it possible, as well as to obtain a thin housing, to arrange the above electric circuit in the vicinity of the display panel, eliminating the need for an inconveniently long wire (cable) to connect the display panel all the way down to a distant electric circuit. This is particularly effective for a display panel with the wire pulled out from its side.

According to the present invention described above, the housing that covers the perimeter and the back of the display panel has a groove or a convex, making it possible to fix the housing itself to installment parts of the display device or to a setting place such as a wall. In this case, the degree of freedom in choosing a place to set the device is increased if the groove or convex is linear.

To describe the present invention more specifically: the display panel is a display using a plurality of electron-emitting devices, and is held and supported by a frame body constructed of a metal cover (outer frame) that is formed through extrusion machining and a metal inner frame that is formed similarly through extrusion machining. At this point, it is preferable to arrange a buffer in the holding portion of the frame body so that the display panel is held by the frame body through the buffer. The frame body thus comprises a metal cover excellent in heat conductivity, forming a heat releasing structure with which heat is released through heat absorption and heat conduction. In addition, to construct the frame body from a material formed by extrusion machining, which is universally usable for display panels of various screen sizes, leads to lighter weight and lower cost.

A part of the electric circuit for driving and controlling the display panel is placed in the internal space of the frame body, namely, a clearance between the outer frame and the inner frame, and is fixed there through an attaching member. At this point, it is preferable that the frame body has internally a heat absorbing form and externally a heat releasing form, and that the internal heat absorbing form of the frame body is treated to have on its surface a thin film colored approximate to black.

The perimeter on the back side of the frame body is provided with a linear groove-like rail and with a wall-hanging means that fits with the rail at any point of the rail. Thus, the wall-hanging means can be attached at a suitable point of the rail in accordance with the strength of the wall. In addition, a user may utilizes the rail to fix external speakers, external communication equipment, and a setting stand, making it possible to apply the invention to a multi-screen for a public use.

The display panel may also be adhered and fixed to the inner frame of the frame body using a double side adhesive tape.

The frame body is constructed of: the inner frame comprising four sides of extrusion machining materials which are cut at an angle of about 45° to the extrusion direction and are welded into a united frame; and the outer frame comprising four sides of extrusion machining materials which are cut at an angle of about 90° to the extrusion direction and are assembled into a frame while inserting a corner member at the junction of two sides. The inner frame is fixed with a screw to the outer frame at the back thereof to form the frame body.

Now, an additional description will be given on the basic structure and the operation principle of an image display device of the present invention. An image display device to which the present invention is desirably applied is a device provided with a display panel that uses an electron-emitting device, an example of which is a surface conduction electron-emitting device. According to the principle operation of the device, between two substrates facing each other where a vacuum clearance is formed, a positive electrode and a negative electrode for electron emission are formed from an electro conductive film at each pixel position on a rear glass plate (rear plate) on the back side. One positive electrode and one negative electrode are arranged so as to face each other, while putting an interval of several tens [μm] between two adjacent pairs of electrodes. Then an X-directional wiring is formed by a printing method to lead an electric signal to the positive electrode from an electric mounting circuit outside the vacuum clearance. Formed thereafter is an interlayer insulating film for electrically insulating the X-directional wiring from a Y-directional wiring to be described later at an intersection of the X-directional wiring and the Y-directional wiring. The Y-directional wiring is then formed by a printing method to lead an electric signal to the negative electrode from an electric mounting circuit outside the vacuum clearance. An electro conductive thin film of fine particles for connecting the the positive electrode to the negative electrode is further deposited, and electric potentials are given to the positive electrode and the negative electrode to form an electron-emitting region in a part of the electro conductive thin film.

On the other hand, in a vacuum clearance of a front glass plate (face plate) on the front side of the facing substrates, a black stripe film for improving the contrast and three fluorescent films having hues of primary color of R, G, B are formed, and an electro conductive metal back film is further formed thereon. On the outer surface of this front glass plate, a resin film for preventing glass from scattering is pasted. An electro conductive film for preventing electrification and a low reflective film for improving the contrast are formed on the surface of the resin film.

The electron-emitting device acts such that: a voltage of ten [v] and some more is applied between the x-directional wiring and the y-directional wiring which are selected in the electric mounting circuit to emit electrons from the electron-emitting device, and the emitted electron is accelerated by a positive electric potential of several [kv] supplied from an external high voltage source to the metal back film of the vacuum clearance of the front glass plate, and the accelerated electron bumps against the phosphor film to emit light. A flexible cable connecting an inner glass plate to the electric mounting circuit is connected electrically and mechanically via a connector on the electric mounting circuit side, and meanwhile, is connected electrically and mechanically via an isotropic electro conductive film to an electrode portion (wiring end) of the x-directional wiring and the y-directional wiring which are printed on the rear glass plate. A high voltage cable connecting the metal back film of the front glass plate to a high voltage source circuit is electrically and mechanically connected on the high voltage source circuit is electrically and mechanically connected on the high voltage source circuit side via a connector for high voltage, and meanwhile on the front glass plate side, is electrically and mechanically connected tot he metal back via a high voltage terminal piercing through the rear glass plate. The high voltage terminal is used here to keep the degree of vacuum in the vacuum clearance (for details, see Japanese Patent Application Laid-Open No. 7-23525).

[Embodiment 1]

Figure 2A:
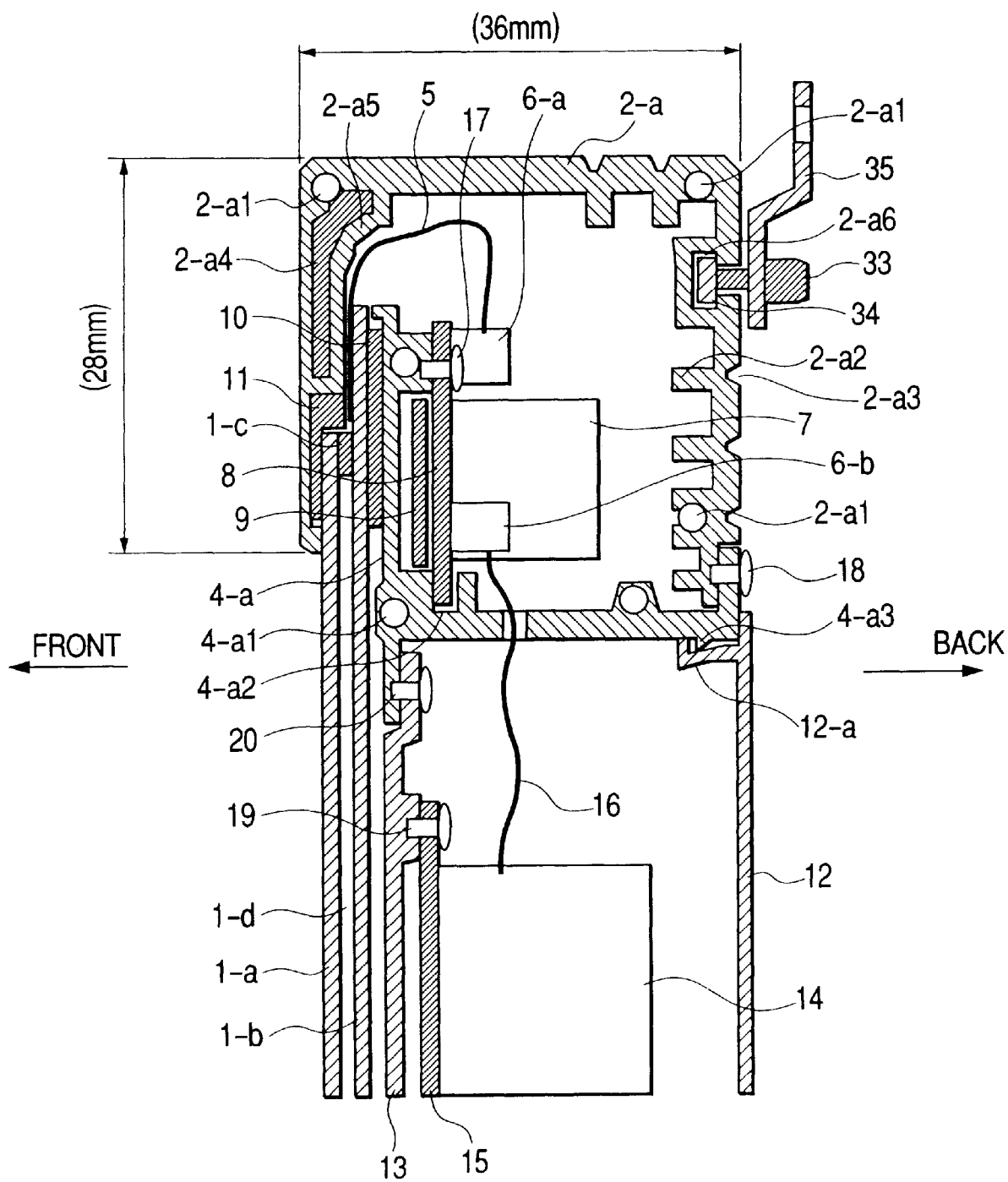
FIG. 2A is a vertical sectional view mostly illustrating the features of the first embodiment in accordance with the present invention.
Figure 2B:
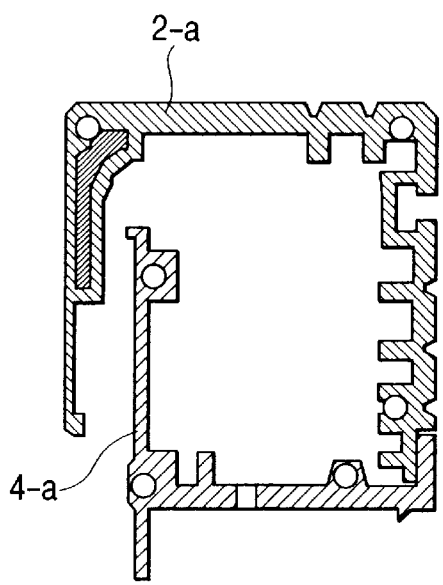
FIG. 2B is a longitudinal sectional view of a frame.
Figure 2C:
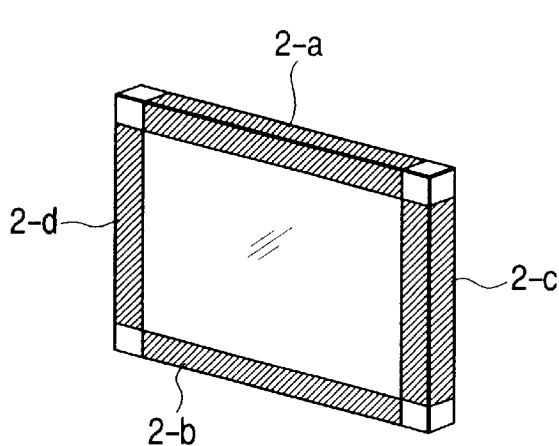
FIG. 2C is an external view of a frame.
Figure 3:
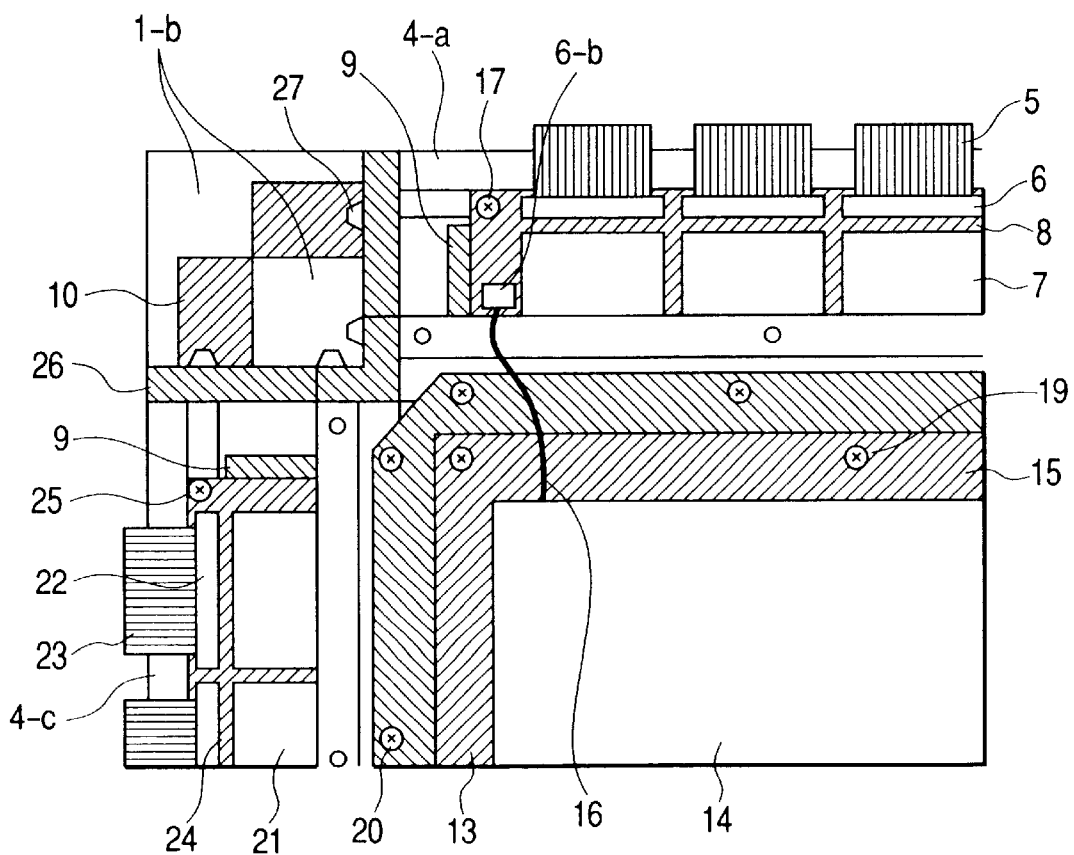
FIG. 3 is a plan view showing the internal structure, which illustrates the features of the first embodiment in accordance with the present invention.
Figure 4:
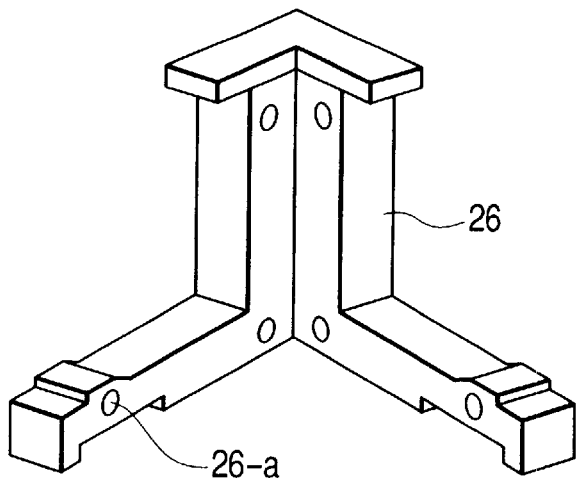
FIG. 4 is an external view of components at an inner frame corner portion in accordance with the first embodiment of the present invention.
Figure 5:
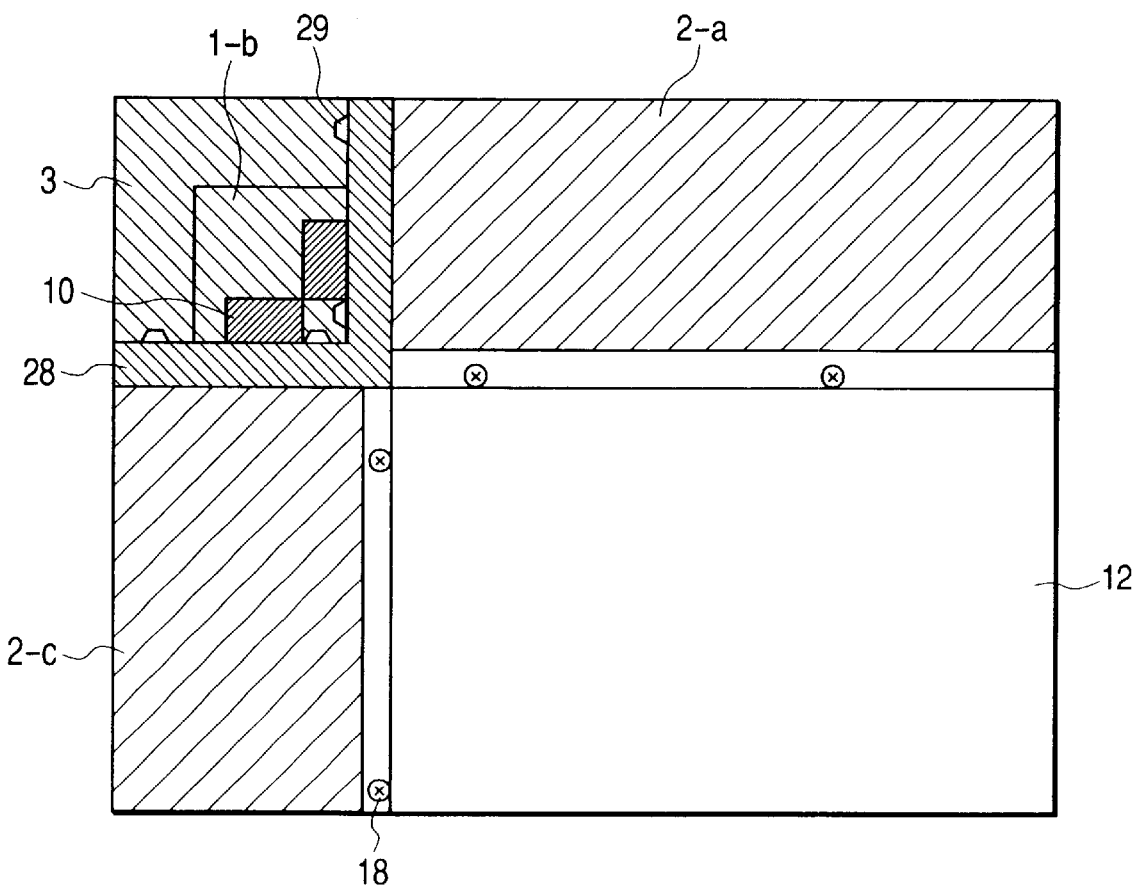
FIG. 5 is a plan view showing the structure in the vicinity of the corner as viewed from the back, which illustrates the features of the first embodiment in accordance with the present invention.
Figure 6:
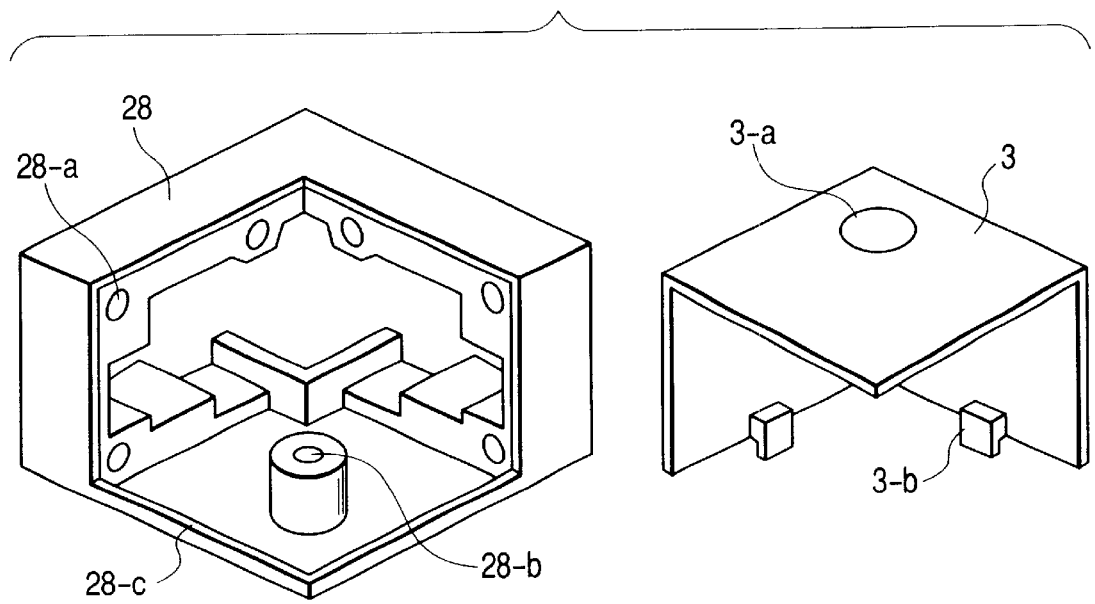
FIG. 6 is an external view of components at an outer frame corner portion in accordance with the first embodiment of the present invention.
Figure 7:
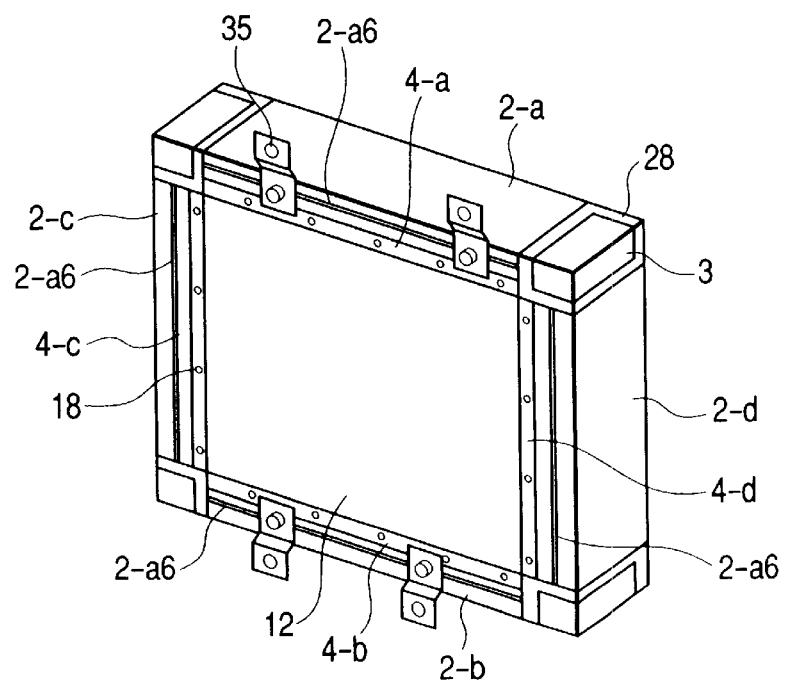
FIG. 7 is an external view as viewed from the back, which illustrates the features of the first embodiment in accordance with the present invention.
Figure 8A:
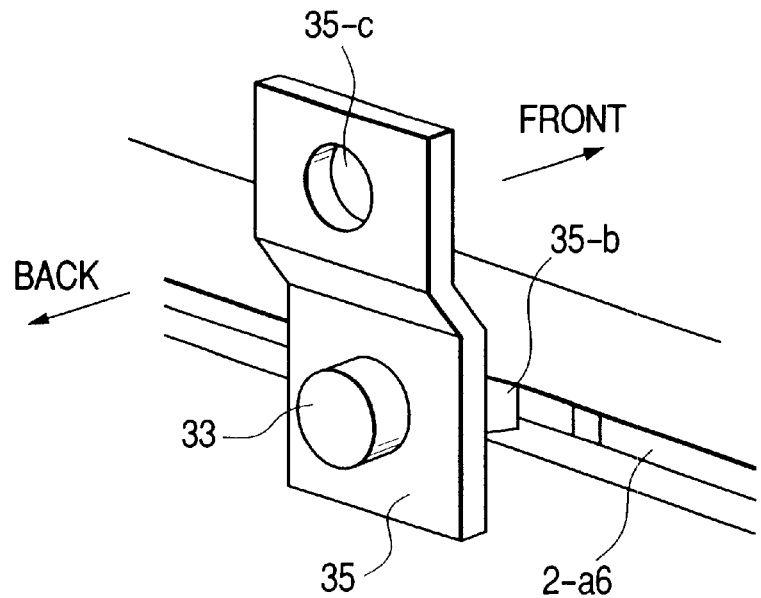
FIGS. 8A and 8B are enlarged views showing a wall-hanging means, which illustrates the features of the first embodiment in accordance with the present invention.
Figure 8B:
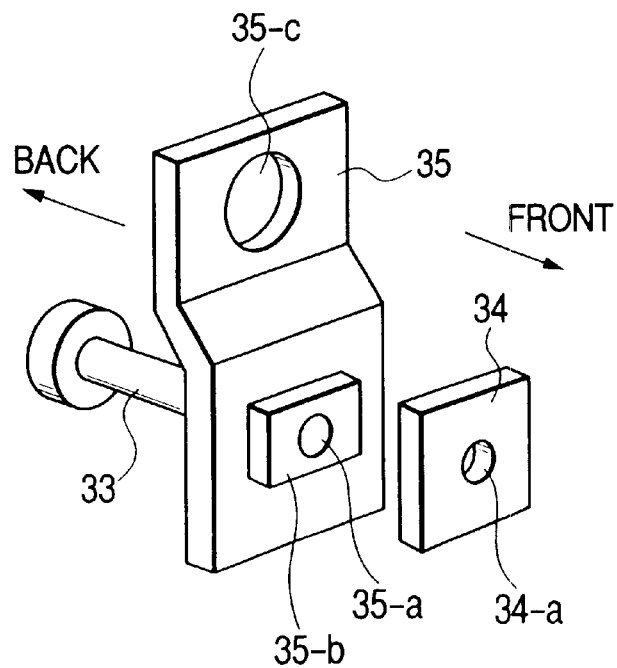

FIG. 1 is an external view showing an installation example of an image display device, which most illustrates the features of a first embodiment in accordance with the present invention. FIG. 2A is a vertical sectional view taken along an area of FIG. 1. FIG. 2B is also a vertical sectional view taken along an area with built-in components omitted. FIG. 2C is an external view. FIG. 3 is a plan view showing that internal components mounted in the vicinity of one corner as viewed from the back, which most illustrates the features of the first embodiment in accordance with the present invention. FIG. 4 is an external view of components at an inner frame corner portion. FIG. 5 is a plan view showing the vicinity of the corner portion with partial components removed as viewed from the back. FIG. 6 is an external view of components at an outer frame corner portion. FIG. 7 is an external view as viewed from the back. FIGS. 8A and 8B are enlarged views of a wall-hanging means at the back in accordance with the present invention. Throughout the figures, the same reference numerals represent the same components or the same parts.

Reference numeral 1 denotes a display panel in an image display device for use with electron-emitting devices. Reference numeral 1-*a* denotes a front glass plate (face plate) comprising a resin film (not shown) having a low-reflective film and an electro conductive film which is stuck to each other at the front surface, and also comprising a black stripe film, phosphor films of R, G and B colors and an electro conductive film formed on the inside surface. Reference numeral 1-*b* denotes a rear glass plate (rear plate) including matrix wiring printed on the surface of the front glass plate side while sandwiching an electron-emitting device and an insulating layer. Reference numeral 1-*c* denotes a chassis in which the front glass plate 1-*a* is jointed to the rear glass plate 1-*b* via low-melting-point glass to form a vacuum container. Reference numeral 1-*d* denotes clearance in the vacuum container, containing a spacer (not shown) for supporting the atmosphere and a gas-absorbing member (not shown) for keeping a high vacuum. Reference numeral 2-*a* denotes an upper outer frame side on which continuous grooves or ribs are formed by the extrusion machining. The upper outer frame side is made of metal such as aluminum alloy or magnesium alloy. The exterior surface is subjected to the formation coating process and resin painting while the inner surface is subjected to the formation coating process and black coating. Reference numeral 2-*a*1 denotes a female screw hole in the upper outer frame side used for fixture when a frame is assembled in the image display device. Reference numeral 2-*a*2 denotes heat absorbing fins, which are continuously formed on the upper outer frame side by the extrusion machining. Reference numeral 2-*a*3 denotes heat releasing fins, which are continuously formed in the upper outer frame side by the extrusion machining. Reference numeral 2-*a*4 denotes a hollow portion of the upper outer frame side, which is substantially square U-shaped to improve solidity at the corner portion of the upper outer frame side. Reference numeral 2-*a*5 denotes a curved portion of the upper outer frame side, and a Y-driver output cable 5 described later passes through the vicinity thereof. Reference numeral 2-a6 denotes a rail adapted to place a wall-hanging means 35 described later in a suitable position. Reference numerals 2-b, 2-c and 2-d denote a lower outer frame side, a right outer frame side and a left outer frame side, respectively. These three frame sides are also substantially square U-shaped in section that is the same as the upper outer frame side 2-a shown in FIG. 2B, and 2-a1, 2-a2, 2-a3, 2-a4, 2-a5 and 2-a6 named in the above are commonly employed therein. Reference numeral 3 denotes cosmetic covers as an external appearance of the corners of the image display device. Reference numeral 3-a denotes holes into which screws (not shown) for fixing the cosmetic covers 3 are inserted, and reference numeral 3-b denotes cosmetic cover fingers for securing the cosmetic covers 3 to the associated components to be brought into contact therewith. Reference numeral 4-a denotes an upper inner frame side on which continuous grooves or ribs are formed by the extrusion machining. Reference numeral 4-a1 denotes a female screw hole in the upper inner frame side used for fixture when a frame is assembled in the image display device. Reference numeral 4-a2 denotes electric board insertion portion of the upper inner frame side, which is sequentially formed by the extrusion machining. Reference numeral 4-a3 denotes finger receiving portion of the upper inner frame side for fixing a back cover 12 described later, which is sequentially formed by the extrusion machining. Reference numerals 4-b, 4-c and 4-d denote a lower inner frame side, a right inner frame side and a left inner frame side, respectively. These three frame sides each are also substantially L-shaped in section that is the same as the upper inner frame side 4-a shown in FIG. 2B, and 4-a1, 4-a2, and 4-a3 named in the above are commonly employed therein. Reference numeral 5 denotes a Y-driver output cable, one end of which is electrically mechanically connected to a Y-directional wiring electrode portion (wiring end portion), and the other end of which is electrically mechanically connected to a Y-driver output connector 6-a described later. The Y-driver output connector 6-a is so constructed that the Y-driver output cable 5 can be inserted/removed thereinto/therefrom, and is mounted on a surface of a Y-driver board 8. Reference numeral 6-b denotes a Y-driver input connector mounted on the surface of the Y-driver board 8. Reference numeral 7 denotes a Y-driver electric circuit for generating an electric drive signal for image display in a Y-driver electric circuit, in which a pulse width is modulated to select and drive each electron-emitting device. The Y-driver board 8 has the Y-driver output connector 6-a, the Y-driver electric circuit 7, and other electric devices (not shown) mounted thereon, including a circuit pattern (not shown) formed on its surface. The Y-driver board 8 is positioned by the electric board insertion portion 4-a2 of the upper inner frame side 4-a. Reference numeral 9 denotes a flame-resistant insulating plate arranged so that lead portions of the above-described electric devices may not be electrically contacted with the upper inner frame side 4-a. It will be noted that the Y-driver output cable 5, the Y-driver output connector 6-a, the Y-driver input connector 6-b, the Y-driver electric circuit 7, the Y-driver board 8 and the insulating plate 9 are also commonly employed in the lower inner frame side 4-b. Reference numeral 10 denotes a rear buffer disposed between the rear glass plate 1-b and the upper inner frame side 4-a. The rear buffer 10 is positioned in the groove in the upper inner frame side 4-a, attaining to prevent damage of the rear glass plate 1-b and to absorb shock affected from the external on the entire display panel 1. Reference numeral 11 denotes a front buffer disposed between the front glass plate 1-a of the display panel and the upper outer frame side 2-a. The front buffer 11 is positioned in the groove in the upper inner frame side 4-a, attaining to prevent damage of the front glass 1-a and to absorb shock affected from the external on the entire image display unit 1, and further attaining to allow level difference of the buffer 11 to position the front glass plate 1-a. The rear buffer 10 is disposed on each of the four sides 4-a, 4-b, 4-c and 4-d of the inner frame. The front buffer 11 is also disposed on each of the lower outer frame side 2-b, the right outer frame side 2-c and the left outer frame side 2-d. The back cover 12 constitutes the back surface of the image display device, serving to prevent dust from entering to the inside or to prevent one from touching the internal electric circuit and electrifying. Reference numeral 12-a denotes a back cover finger to be engaged with the finger receiving portion 4-a3 of the inner frame. With elasticity of the finger, the back cover 12 can be positively fixed to the upper inner frame side 4-a without any screw. Reference numeral 13 denotes a board attaching plate for supporting an electric circuit substrate described later. The board attaching plate 13 is produced by press-machining metal such as aluminum alloy but may be integrally formed or finished into an appropriate configuration by welding or using rivets after being divided. Reference numeral 14 denotes a signal processing circuit that is a part of the electric circuit, and reference numeral 15 denotes a signal processing circuit board on which these circuits are mounted, including a wiring pattern on its surface. Reference numeral 16 denotes a connection cable adapted to output an electric signal from the signal processing circuit 14 to the Y-driver electric circuit 7, for electrically connecting an output connector (not shown) of the signal processing circuit 14 to the Y-driver input connector 6-b. Reference numeral 17 denotes screws each for fixing the Y-driver board 8 to the upper inner frame side 4-a, which are used at a certain interval (although only one of the screws is shown in the figures). Reference numeral 18 denotes outer frame fixing screws each for fixing the upper outer frame side 2-a to the upper inner frame side 4-a, which are used at plural positions (although only one of the positions is shown in the figures). Reference numeral 19 denotes board fixing screws each for fixing the signal processing circuit board 15 to the board attaching plate 13, which are used at plural places (although only one of the positions is shown in the figures). Reference numeral 20 denotes board attaching plate fixing screws for fixing the board attaching plate 13 to the sides 4-a, 4-b, 4-c, and 4-d of the inner frame, respectively, which are used at plural places (although only one of the positions is shown in the figures). Reference numeral 21 denotes an electric circuit for generating an electric drive signal for image display in an X-driver electric circuit, in which a scanning signal of each electron-emitting device is outputted. Reference numeral 22 denotes an X-driver output connector mounted on an X-driver board 24 described later, which can be electrically mechanically connected to an X-driver output cable 23. Reference numeral 23 denotes an X-driver output cable for supplying the electric signal generated by the X-driver electric circuit 21 to an electrode portion (not shown) of the rear glass plate 1-b of the display panel 1. Reference numeral 24 denotes an X-driver board on which the X-driver output connector 22, the X-driver electric circuit 21, etc. are mounted, including a wiring pattern on its surface. Reference numeral 25 denotes an X-drive board fixing screw for fixing the X-driver board 24 to the right inner frame side 4-c. It will be noted that the X-drive electric circuit 21, the X-driver output connector 22, the X-driver output cable 23, the X-driver board 24, and the X-driver board fixing screw 25 are also commonly employed in the left inner frame side 4-d. Reference numeral 26 denotes inner frame fixing members for connecting and fixing the adjacent sides, i.e., the upper inner frame side 4-a to the right inner frame side 4-c, the upper inner frame side 4-a to the left inner frame side 4-d, the lower inner frame side 4-b to the right inner frame side 4-c, the lower inner frame side 4-b to the left inner frame side 4-d, which are united into a frame. Each inner frame fixing member 26 includes therein an insertion portion 26-a into which a screw 27 is inserted as described later. Reference numeral 27 denotes inner frame fixing screws for fixing the inner frame fixing member 26 to the respective sides of the inner frame. Reference numeral 28 denotes an outer frame fixing member for connecting and fixing the adjacent sides, i.e., the upper outer frame side 2-a to the right outer frame side 2-c, the upper outer frame side 2-a to the left outer frame side 2-d, the lower outer frame side 2-b to the right outer frame 2-c, the lower outer frame side 2-b to the left outer frame side 2-d, which are united into a frame. Reference numeral 28-a denotes screw insertion portions as described later; 28-b, female screw portions provided on bosses for fixing the cosmetic covers 3; and 28-c, finger insertion portions into which the cosmetic cover fingers 3-b are engaged. Reference numeral 29 denotes outer frame fixing screws for fixing outer frame fixing members 28 to the respective sides. The outer frame fixing screws 29 are passed through six screw insertion portions 28-a in the outer frame fixing member, and are fitted into the outer frame female screw holes (in the upper outer frame side, three female screw holes 2-a1) in the respective sides. Thus, the four sides of the outer frame comprising are united into a frame. The outer frame fixing members 28 and the cosmetic covers 3 have a common shape to form the corners of the image display device, and are also commonly used at the joint of the upper outer frame side 2-a and the left outer frame side 2-d, the joint of the right outer frame side 2-c and the lower outer frame side 2-b, the joint of the left outer frame side 2-d and the lower outer frame side 2-b, which are united into a frame. Reference numeral 30 denotes a wall surface on which the image display device is installed. Reference numeral 31 denotes a power source tuner box of the image display device including interfaces for a television signal, a video signal, an RGB signal, etc. from the external, and a signal conversion output circuit to the image display device, serving to supply electric power to the image display device. Reference numeral 32 denotes speakers external to the image display device. The speakers are placed at the right and left to the image display device, attaining liveness. Needless to say, these external devices may be set on the wall surface to save space. FIG. 8A is a view as viewed from the back in which the wall-hanging means is fixed in position, and FIG. 8B is an external view showing the structure of the wall-hanging means as viewed from the front. Reference numeral 33 denotes a rail screw for fixing a wall-hanging means 35 described later to the image display device. The rail screw 33 is integrally formed by a handle portion larger in diameter and a male screw portion smaller in diameter. Reference numeral 34 denotes a rail nut for fixing the wall-hanging means 35 described later to the image display device. The rail nut 34 is inserted into the groove in the rail 2-a6 for fixture. Reference numeral 34-a denotes a female screw hole bored in substantially the center of the rail nut 34, into which the male screw portion of the rail screw 33 is screwed. Reference numeral 35 denotes a wall-hanging means used to set the image display device on the wall, including a screw-passing portion 35-a through which the male screw portion of the rail screw 33 is passed, a rail guide portion 35-b of the wall-hanging means which is engaged into the inlet of the groove in the rail 2-a6, and a wall fixing portion 35-c of the wall-hanging means through which a screw (not shown) or the like is passed to fix the wall-hanging means to the wall.

The foregoing structure will now be described in detail. To begin with, an assembling process will be described in order. First, the insulating plate 9 and the y-driver board 8 having devices mounted thereon are installed into the positioning grooves in the upper inner frame side 4-a and the lower inner frame side 4-b of the image display device, respectively. Also, the insulating plate 9 and the x-driver board 24 having devices mounted thereon are installed into the positioning grooves in the right inner frame side 4-c and the left inner frame side 4-d, respectively. Then, the inner frame fixing member 26 and four out of the plural inner frame fixing screws 27 are used to connect each of the four upper/lower/right/left sides of the inner frame to one another, which are then united into a frame. The board attaching plate 13 is inserted into the resulting frame, and is then fixed to the respective sides 4-a, 4-b, 4-c, and 4-d of the inner frame by the plural board attaching plate fixing screws 20. The connection cables 16 are led out from the y-driver input connectors 6-b of the upper and lower sides, and passed through the through-holes in the upper inner frame side 4-a and the lower inner frame side 4-b. The through-holes are secondarily fabricated in the upper inner frame side 4-a and the lower inner frame side 4-b, which have been subjected to the extrusion machining. Similarly, a connection cable (not shown) is also led out of the right and left x-driver electric circuits 21, and passed through the through-holes in the right inner frame side 4-c and the left inner frame side 4-d. Then, the signal processing circuit board 15 having electric circuit devices thereon is placed on the board attaching plate 13, and then fixed by the plural board fixing screws 19, and the plural connection cables 16 are connected to connectors (not shown) of circuits represented by the signal processing circuit 14. Now, the description completes the arrangement at the rear side, going on the assembling of the display panel 1.

The rear buffer 10 is fitted into the positioning grooves (provided between the ribs in the figures) in each of the inner frame sides 4-a, 4-b, 4-c, and 4-d, and thereafter the display panel 1 delivered by an absorption pad-equipped arm (not shown) in an assembling device is brought into light contact with the rear buffer 10 at the illustrated position. The plural Y-driver output cables 5 that is previously thermally press-fitted by an anisotropic electro conductive film (not shown) are longitudinally connected to the respective sides of the display panel 1, and the plural X-driver output cables 23 are horizontally connected thereto. Then, their tip ends are inserted into the Y-driver output connectors 6-a and the X-driver output connectors 22. Subsequently, the front buffer 11 that has been fitted into the positioning groove (provided between the ribs in the figures) in the upper outer frame side 2-a is put onto the upper side of the front glass plate 1-a of the display panel 1 from the front upper direction, and is then fixed to the upper inner frame side 4-a using the plural outer frame fixing screws 18 at the back side. Incidentally, the level difference of the front buffer 11 allows the upper end of the front glass plate 1-a to be positioned (regulated in the upper direction) in the display panel 1. In a similar manner, the front buffer 11 that has been fitted into the right outer frame side 2-c is put onto the right side of the front glass plate 1-a of the display panel 1 from the front right direction, and is then fixed to the right inner frame side 4-*c* using the plural outer frame fixing screws 18 at the back side. Incidentally, the level difference of the front buffer 11 allows the right end of the front glass plate 1-*a* to be positioned (regulated in the right direction) in the display panel 1. The lower outer frame side 2-*b* and the left outer frame side 2-*d* are also united into a frame of the display panel 1 in the same manner so that the display panel can be positioned in the upper/lower/right/left directions with the level difference of the front buffer 11 fitted into the four sides. The plural rail nuts 34 are inserted into the grooves in the rails 2-*a*6 of the respective outer frame sides 2-*a*, 2-*b*, 2-*c*, and 2-*d* of the image display device, and the four outer frame fixing members 28 are fitted into the respective corners at the ends of the respective outer frame sides. Then, the plural outer frame fixing screws 29 are used to positively connect and fix the respective outer frame sides to one another. Therefore, a frame at the front side (corresponding to the front cover) is thus assembled. The image display panel 1 is held and supported between the front-side frame formed by the outer frame sides and the back-side frame formed by the inner frame sides, so that the absorption pad-equipped arm is removed from the display panel 1. Thereafter, an electric signal and a voltage are supplied from the signal conversion output circuit and the power source to the signal processing circuit board 15 including signal processing circuit 14 at the back side, to thereby drive the image display panel 1 to display an color image. After various kinds of quality adjustment is made during this process, the back cover 12 at the back side is fitted into the four inner frame sides 4-*a*, 4-*b*, 4-*c* and 4-*d*, and the cosmetic covers 3 are further fitted into the respective corners, which is then fixed by screws (not shown). In the subsequent process, a user who purchases the image display device sets it to the wall. First, the user confirms the dimension of a portion of the wall with enough strength, such as a beam. The user adjusts the rail nuts 34 inside the rail 2-*a*6 of the image display device so as to be aligned with the beam, and puts the wall-hanging means 35 into a position where the screw-passing portion 35-*a* of the wall-hanging means 35 can be aligned with the female screw 34-*a* of the rail nut 34. The rail guide portion 35-*b* of the wall-hanging means 35 is fitted into the inlet portion of the rail 2-*a*6, and then the rail screw 33 is passed through the screw-passing portion 35-*a* and is screwed into the female screw 34-*a*. The rail screw 33 is rotated to attract the rail nuts 34 toward the wall-hanging means 35 so that the inlet portion of the rail 2-*a*6 is held and fixed between the wall-hanging means 35 and the rail nut 34. Afterward, a required number of wall-hanging means 35 are all fixed in position, and then the image display device is set in a predetermined position on the wall. The attaching screws (not shown) are inserted through the wall-fixing portion 35-*c* of the wall-hanging means 35 and screwed into the wall, thus completing to set the image display device.

The assembling work of the image display device is thus completed. Now, the characteristic operation and structure of the present invention will be further described. The Y-driver electric circuit 7 or the X-driver electric circuit 21 incorporated into the image display device has large screen size and a great number of channels, resulting in high capacity of current with high heat generation. If the generated heat is not efficiently radiated to the outside, the electric devices themselves in that circuit may malfunction. Referring to FIGS. 2A to 2C by way of example, in the structure according to the present invention, the heat generated by the Y-driver electric circuit 7 is transmitted to the ambient air, which is then separated into one further transmitted to the upper outer frame side 2-*a* and one further transmitted to the upper outer frame side 2-*a* by heat releasing. The upper outer frame side 2-*a* is made of aluminum or magnesium, with excellent in thermal conductivity. The heat absorbing fins 2-*a*2 of the upper outer frame side that are continuously formed on the inner surface and is further painted into approximately black absorbs heat from the warm air. The heat released from the Y-driver electric circuit 7 is also efficiently absorbed by the heat absorbing fins 2-*a*2. The absorbed heat is further released from the heat releasing fins 2-*a*3 of the upper outer frame side to the air external to the housing. Such instrument of transmitting and releasing heat is also implemented in the vicinity of the lower Y-driver electric circuit 7 and in the vicinity of the right and left X-driver electric circuits 21.

The supporting mechanism of the display panel 1 is so constructed that the display panel 1 is clamped between the outer frame sides 2-*a* to 2-*d*, which constitute a casing, and the inner frame sides 4-*a* to 4-*d*, which constitute a casing. The former is substantially square U-shaped in section, and the latter is substantially L-shaped in section. Therefore, the casing itself has sufficient rigidity so as not to affect stress on the image display unit 1 if any external force is applied thereto when the image display device is transported or handled. It is assumed that the casing of the present invention be made of an aluminum material having a thickness of about 1.5 mm or a magnesium material having a thickness of about 1.9 mm. The image display device according to the present invention is about 36 mm thick. The border size of the frame is about 28 mm.

The front buffer 11 and the rear buffer 10 are arranged at the both surfaces of the display panel 1, reducing any externally affected vibration or shock on the display panel 1. It is assumed that these heat absorbing materials each be made of urethane rubber or silicon rubber with a thickness of about 2 mm in average with the rubber hardness of 70 to 90. A curved surface is formed inside the outer frame sides 2-*a* to 2-*d* and in the vicinity of the wiring of the Y-driver output cable 5 and the X-driver output cable 23. This possibly prevents the surface of the cables less coated from being scratched and eliminates care with insulating failure. A hollow portion is formed inside the outer frame sides 2-*a* to 2-*d* and at the corner portion of the substantially square U-shape, improving rigidity with less weight increase.

Furthermore, if the image display device of the present invention is hung on the wall, the wall-hanging means can be selectively positioned on an arbitrary position having a horizontal length of 920 mm on the rail or an arbitrary position having a vertical length of 510 mm on the rail, given that the 42-type television screen with aspect ratio of 16:9.

Further importantly, in the image display device of the present invention, the aforementioned respective frame sides are made by the extrusion machining. The extrusion machining is featured that the machining of the same sectional configuration can be sequentially performed, with inexpensive machining unit price since a single billet can be molded into parts of several tens meters per minute depending upon facility, with low production costs since the mold with a diameter of about 200 mm is sufficient. Given that the 42-type television screen with aspect ratio of 16:9 according to the present invention, the frame sequentially made by the extrusion machining is cut and employed so that the upper outer frame side 2-*a* and the lower outer frame side 2-*b* may be about 920 mm wide and the right outer frame side 2-*c* and the left outer frame side 2-*d* may be about 510 mm wide. If this casing frame is integrally molded by press machining, the machining into the heat absorber and heat releasing fins, the positioning grooves of the associated parts, the rail grooves and the like of the present invention is difficult. Even if the mold is possible, a large-sized press machine equivalent to that for machining the automobile components will be required. Moreover, several kinds of molds are required in plural steps to machine into the substantial square U-shape or substantial L-shape with remarkably high production costs of such molds. Still further, the image display device of the present invention can be applied to mass produce many kinds of products with the 50-type and 60-type television screen or aspect ratio of 4:3, etc. by modifying the cut dimension after molding by the aforementioned extrusion machining.

[Embodiment 2]

Figure 9A:
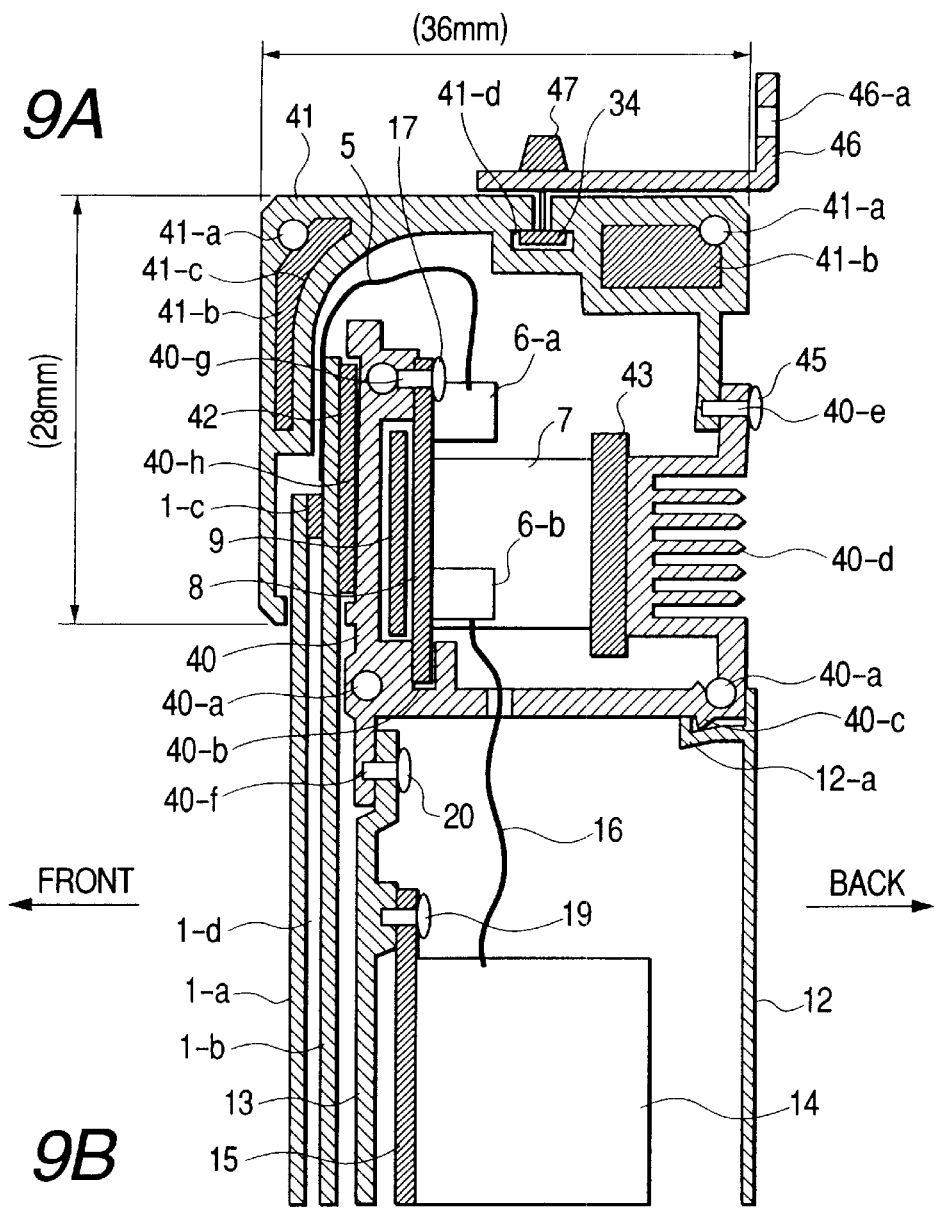
FIG. 9A is a vertical sectional view, which illustrates the features of a second embodiment in accordance with the present invention.
Figure 9B:
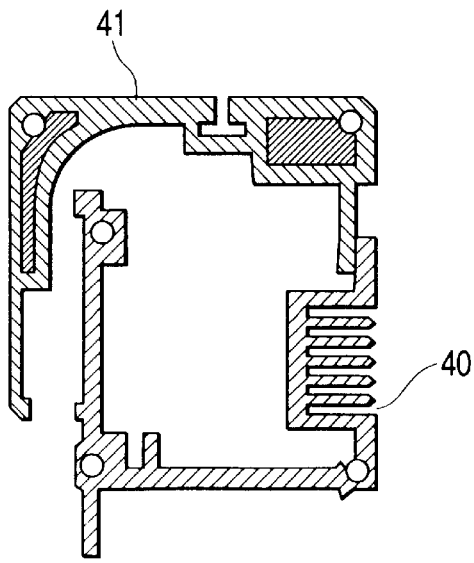
FIG. 9B is a longitudinal sectional view of one frame side.
Figure 10:
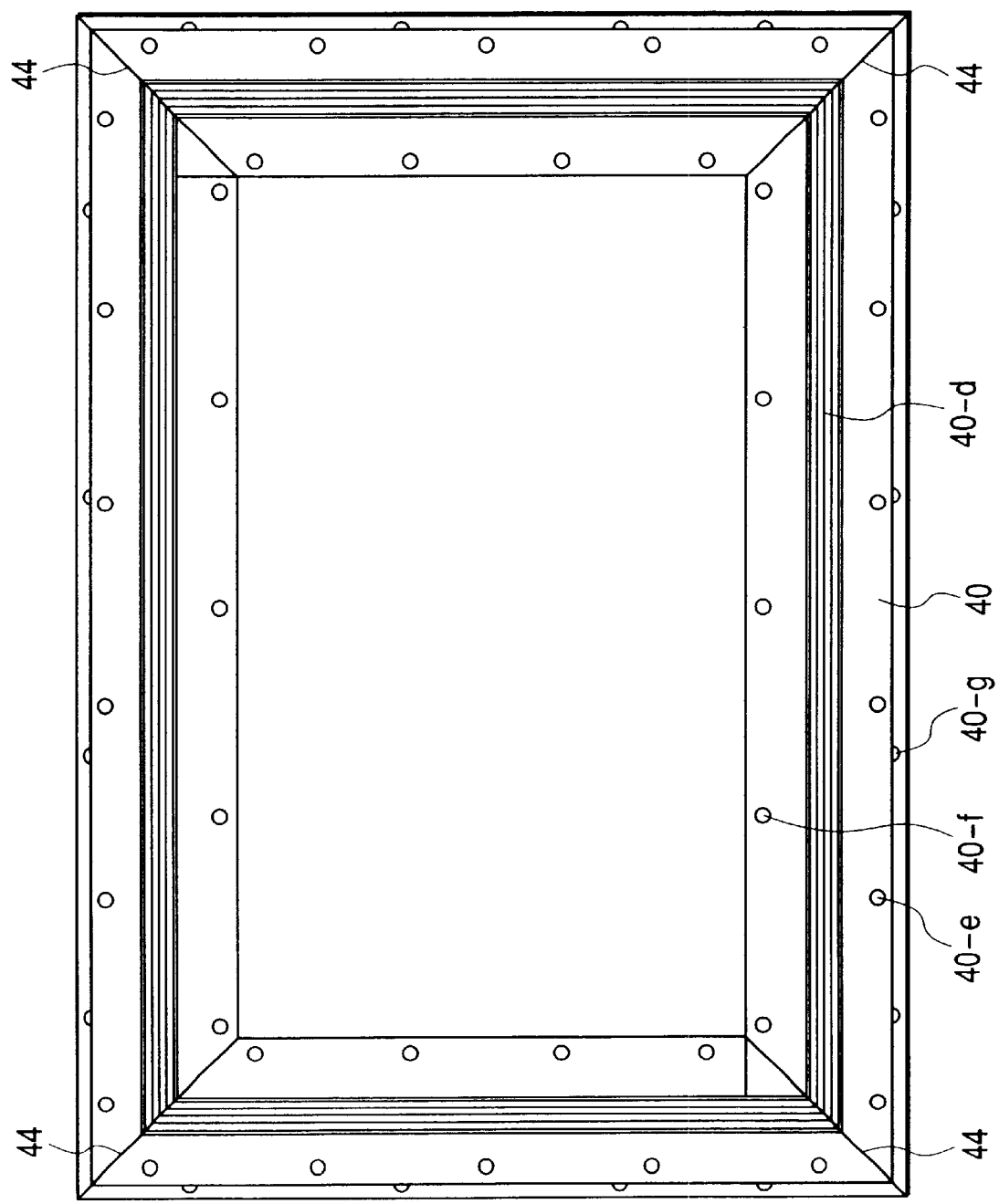
FIG. 10 is a plan view of an inner frame, which most illustrates the features of the second embodiment in accordance with the present invention.

FIG. 9A is a vertical sectional view, which most illustrates the feature in accordance with a second embodiment of the present invention, taken along an area of FIG. 1 in Embodiment 1. FIG. 9B is also vertical sectional view taken along an area with built-in components omitted. FIG. 10 is a plan view showing the inner frame sides of the image display device according to the present invention. Throughout the figures, the same parts and components are designated by the same reference numerals, omitting their description. Reference numeral 40 denotes an inner frame substantially square U-shaped in section in which grooves or rib screw holes are continuously made by the extrusion machining and the resultant material is cut into a predetermined length, and then their ends are connected to assemble a casing. Reference numeral 40-a denotes a positioning hole sequentially formed in the inner frame, for positioning at the assembling stage into a casing. Reference numeral 40-b denotes a positioning electric board (Y-driver board) insertion portion continuously formed on the inner frame. Reference numeral 40-c denotes a finger receiving portion of the inner frame for fixing the back cover 12, which is continuously formed by the extrusion machining. Reference numeral 40-d denotes heat releasing fins, which are sequentially formed in the inner frame; 40-e, a screw-passing hole formed in the inner frame; 40-f, 40-g, female screw holes formed in the inner frame, all of which are formed by the extrusion machining followed by the secondary machining such as cut-machining or press-machining. Reference numeral 40-h denotes an adhesion-positioning groove sequentially formed in the inner frame 40. Reference numeral 41 denotes an outer frame substantially Lshaped in section in which grooves or ribs are continuously made by the extrusion machining and the machined material is cut into a predetermined length, and then their ends are connected to assemble a casing. Reference numeral 41-a denotes a female screw hole of the outer frame for positioning when the outer frame is united into a frame. Reference numeral 41-b denotes a hollow portion of the outer frame, which is sequentially formed by the extrusion machining at the corner of the outer frame 41. Reference numeral 41-c denotes a curved portion of the outer frame, in the vicinity of which the Y-driver output cable 5 is arranged. Reference numeral 41-d denotes a rail for mounting a wall-hanging means 46, a coupling fixture 49 and a unit attaching fixture 56 as described later in a suitable position. Reference numeral 42 denotes a double coated adhesive tape placed and adhered to the above-described adhesion positioning groove 40-h sequentially formed in the inner frame 40, the other side of which is to be adhered to an edge portion of the rear glass plate 1-b of the display panel 1. The inner frame 40 and the outer frame 41 are also made of metal such as aluminum alloy or magnesium alloy as in Embodiment 1 so that the formation coating process and resin painting are performed on their exterior surfaces and the formation coating process and black coating are performed on their inner surfaces. Reference numeral 43 denotes a thermal conductive material having an adhesive material layer formed on one surface, which is tightly adhered to the Y-driver electric circuit 7. The other side of this material is tightly adhered to the inner wall of the inner frame 40. Reference numeral 44 denotes joint portions of the side edge portions of the inner frame 40, which are jointed by welding. Reference numeral 45 denotes a back-side outer frame fixing screw passing through the screw-passing hole 40-e of the inner frame and screwed into the female screw of the outer frame 41 to connect the inner frame 40 to the outer frame 41. The foregoing structure is common to the hatched portion of FIG. 2C according to Embodiment 1 and the upper/lower/right/left edge portions of the image display device (but the electric board at the right and left edges includes the X-driver electric circuit 21 thereon).

The foregoing structure will now be described in detail. To begin with, an assembling process will be described in order. First, the upper and lower inner frame sides 40 of the image display device, the right side and left side inner frames 40 and the edge-joint portions that are respectively cut at an angle of about 45° relative to the extruding direction of the members are connected to one another. In this regard, a pin (not shown) bent into an L-shape is inserted into the positioning hole 40-a for accurate joint. Thereafter, the joint portions 44 are positively jointed by the spot welding, laser welding, frictional press-fitting welding, etc. to assemble the inner frames 40 into a casing. The adhesive layer of the thermal conductive material 43 is tightly adhered to the surface of the Y-driver electric circuit 7 and the X-driver electric circuit 21.

Subsequently, the insulating plate 9 and the Y-driver board 8 having the associated devices such as the Y-driver electric circuit 7 mounted thereon are respectively arranged at the depicted position on the upper/lower/right/left sides of the inner frame 40 so as to be aligned with the positioning electric board insertion portion 40-b. The Y-driver board fixing screw 17 is screwed into the female screw hole 40-g to fix the Y-driver board 8 to the inner frame 40. The right and left inner frames 20 are constructed in the same manner, in which the insulating plate 9 and the X-driver board 24 having the associated devices such as the X-driver electric circuit 21 mounted thereon are respectively arranged so as to be aligned with the positioning electric board insertion portion 40-b. The board attaching plate 13 is further fitted into the casing constituted by the inner frames 40, and then the plural board attaching plate fixing screws 20 are used to fix it to the female screw holes 40-f of the respective side inner frames. The connection cable 16 is led from the Y-driver input connectors 6-b at the upper side and the lower side and passed though the through-hole in the inner frame 40. The through-hole is fabricated by the secondary machining such as cut-machining or press-machining performed on the inner frame 40 that has been extruded. Similarly, the a connection cable (not shown) is also led out of the X-driver input connector (not shown) mounted on the right side and left side X-driver boards 24 and passed through the through-hole in the inner frame 40. The signal processing circuit board 15 is placed on the board attaching plate 13 and fixed by the plural boar fixing screws 19, which is then connected to the connector (not shown) on the signal processing circuit board represented by the signal processing circuit 14. Now, the assembling process at the back side is completed, going on the assembling of the display panel 1.

The double coated adhesive tape 42 is fitted and adhered to the adhesion-positioning groove 40-h of the four side inner frames 40, and thereafter the display panel 1 delivered by the absorption pad equipped arm (not shown) of the assembling device is lightly depressed onto the double coated adhesive tape 42 at the illustrated position. Under this condition, the edge portion of the display panel 1 is forcibly depressed manually or by a device (not shown), improving the adhesion of the rear glass plate 1-*b* and the double coated adhesive tape 42, and then the absorption pad equipped arm is released. The tip ends of the plural Y-driver output cables 5 and the plural X-driver output cables 23 that are previously connected to the respective sides of the display panel 1 are inserted into the Y-driver output connectors 6-*a* and the X-driver output connectors 22. The four outer frames 41 that have been cut into portions each having an appropriate length for the upper/lower sides and the right/left sides are fitted toward the screen center of the display panel 1 from the edges, and then fixed to the inner frame 40 using the plural back-side outer frame fixing screws 45. The outer frame fixing member 48 (see FIG. 13) having four cosmetic covers described later and having the same screw fixing structure as that of the outer frame fixing member 28 is fitted into the respective corner portions of the outer frame end portions. The outer frames are connected and fixed to one another using the plural outer frame fixing screws 29. The display panel 1 is thus assembled and the casing at the front side (corresponding to the front cover) is completed, and the image display device is completed using the same process as that in Embodiment 1.

Now, the characteristic operation and structure of the present invention will be further described. The Y-driver electric circuit 7 or the X-driver electric circuit 21 incorporated into the image display device has large screen size and a great number of channels, resulting in high capacity of current with high heat generation. If the generated heat is not efficiently radiated to the outside, the electric devices themselves in that circuit may malfunction. In the structure according to the present invention, for example, the heat generated by the Y-driver electric circuit 7 is transmitted to the thermal conductive member 43, which is further transmitted to the inner wall of the inner frame 40, and then radiated to the air external to the housing from the heat releasing fins 40-*d*. The thermal conductive member 43 employed in the present invention is a sheet fabricated by machining material such as aluminum, carbon or graphite into a sheet, film or filler, on either surface of which adhesive material excellent in heat conductivity is formed. The thermal conductive member 43 is elastic with a thickness of about 1 to 5 mm.

The inner frame 40 is made of aluminum alloy or magnesium alloy excellent in heat conductivity, thus efficiently transmitting heat from the inner wall to the heat releasing fins 40-*d*. The right and left X-driver electric circuits 21 also has such features.

The supporting structure of the display panel 1 is such that the double coated adhesive tapes 42 arranged on the inner frames 40 constituting a casing are used to adhere the enter circumference of the rear glass plate 1-*b*. The inner frame 40 is substantially square U-shaped in section, and hollowed at the corner portion. Therefore, the inner frame 40 itself has sufficient rigidity. Furthermore, the respective corner portions are welded, resulting in excellent rigidity of the casing. Therefore, no stress is affected on the image display unit 1 if any external force is applied thereto when the image display device is transported or handled. It is assumed that the casing of the present invention be made of an aluminum material having a thickness of about 1.5 mm or a magnesium material having a thickness of about 1.9 mm. As shown in FIG. 9A, the image display device according to the present invention is about 36 mm thick. The border size of the frame is about 28 mm. Incidentally, the metal frame has high conductivity and a wiring cable scratched on the coating may be shorted. However, according to the present invention, the outer frame 41 is formed with a smoothly curved shape 41-*c*, thus avoiding such risk.

The material of the double coated adhesive tape 42 is elastic since it is made by forming acrylic base adhesive layers on the both sides of foamed silicon or urethane, reducing any externally affected vibration or shock on the display panel 1. The double coated adhesive tape 42 is about 1 to 2 mm thick. While the double coated adhesive tape is employed in the present embodiment, other adhesive means such as rubber base or silicon base adhesive agent may also be available.

Further importantly, in the image display device of the present invention, the aforementioned respective frames are made by the extrusion machining. The feature of the present embodiment is the same as that of Embodiment 1, omitting the description.

Figure 11:
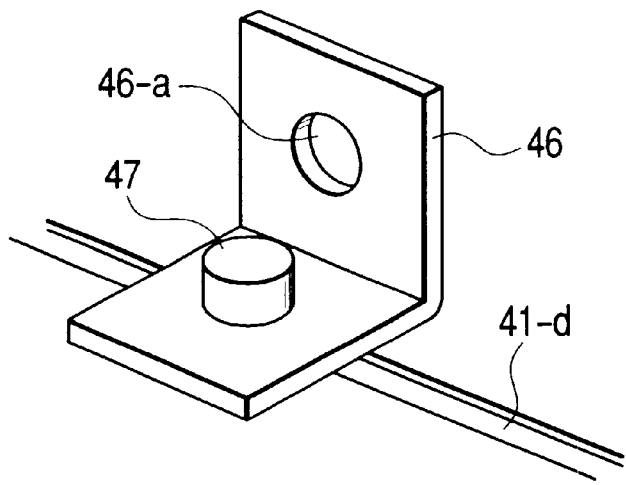
FIG. 11 is an enlarged view of a wall-hanging means which illustrates the features of the second embodiment in accordance with the present invention.

Now, the structure and feature of a linear groove-like rail arranged on the outer circumferential side of the image display device will be described. To begin with, the wall-hanging structure and method according to the present invention will be described. FIG. 11 is an enlarged view showing the wall-hanging means of the present invention. Reference numeral 46 denotes a wall-hanging means for hanging the image display device on a wall, including a wall fixing portion 46-*a* of the wall-hanging means bored with a hole through which it is fixed to the wall using screws, etc., and a through-hole (not shown) for a rail screw 47 described later. The rail screw 47 comprises a knurled tightening portion with a large diameter and a male screw portion obtained by fabricating a male screw smaller in diameter. With the above structure, similar to Embodiment 1, a plurality of rail nuts 34, which are inserted in advance to the interior of the rail 41-*d* of the image display device, are arranged on the wall that has enough strength. After covering each of the rail nuts 34 with the wall-hanging means 46, the rail screw 47 is screwed through a through hole (not shown) of the wall-hanging means 46 into a female screw portion of each of the rail nuts 34. Thus, the entrance of the rail 41-*d* is sandwiched and fixed between the wall-hanging means 46 and each of the rail nuts 34. The plural wall-hanging means 46 are mounted at an appropriate position on the outer circumferential side of the image display device according to the structure and strength of the wall. Thereafter, the wall attaching screw (not shown) is inserted through the wall fixing portion 46-*a* of the wall-hanging means and screwed into the wall surface. Now, the assembling work terminates.

Figure 12:
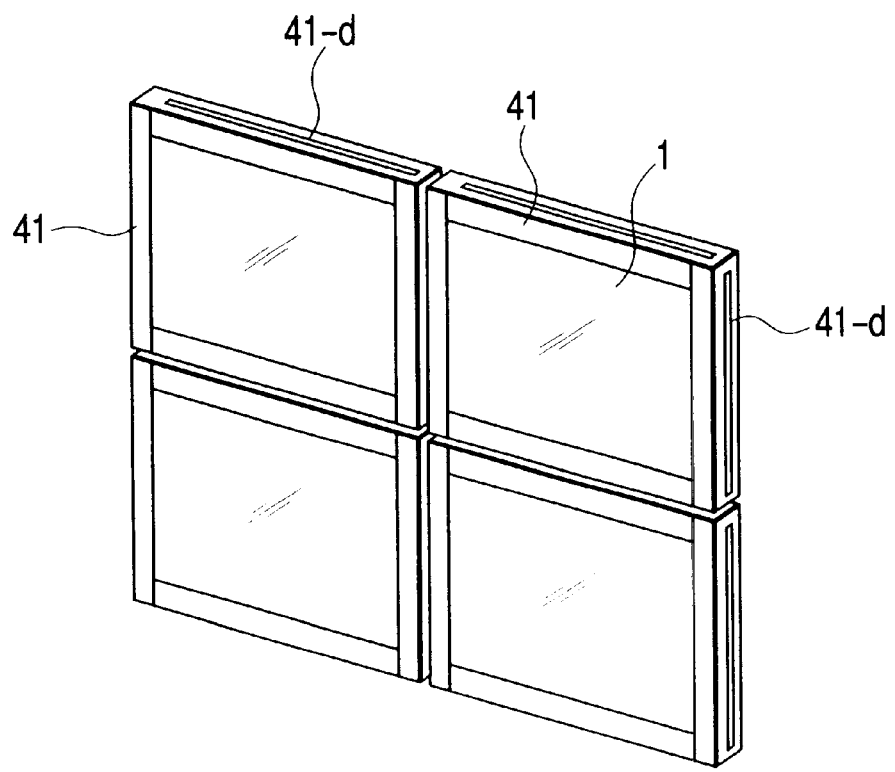
FIG. 12 is an external view showing the connection state of the image display device, which illustrates the features of the second embodiment in accordance with the present invention.
Figure 13:
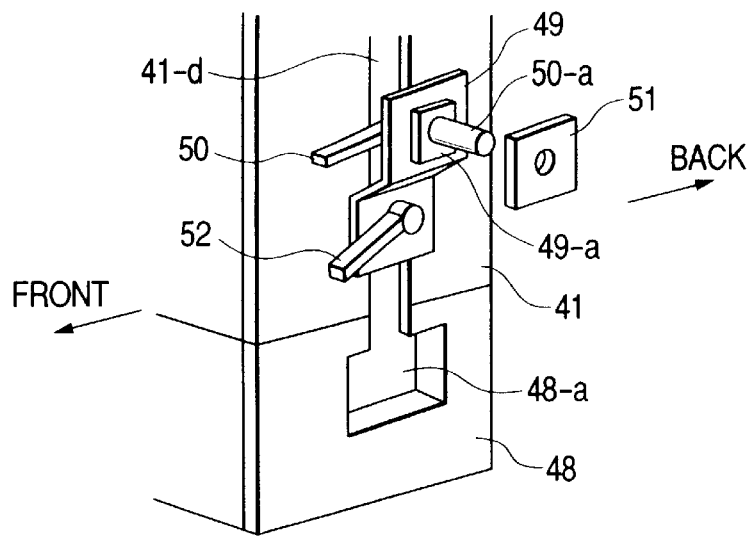
FIG. 13 is an enlarged view showing a side surface coupling means, which illustrates the features of the second embodiment in accordance with the present invention.

Now, the structure and method of vertically or horizontally connecting the plural image display devices will be described. FIG. 12 is an external view showing the state where four image display devices according to the present invention are connected to one another. FIG. 13 is an enlarged external view showing that a side connection fixture of the present invention is mounted to the lower lateral portion of the image display device. Reference numeral 48 denotes a cosmetic cover portion of the outer frame fixing member having the same purpose as that of the cosmetic cover 3 in Embodiment 1, and having the internal structure that the outer frames 41 are connected and fixed to one another. Reference numeral 48-*a* denotes a groove shaped nut insertion portions formed at two places (only one place is shown in FIG. 13, and the other place is formed in the lower surface) in the outer circumferential portion 2 of the cosmetic cover portion of the outer frame fixing member. The nut insertion portion comprises an opening larger than the outer profile of a rail nut 51 described later, and a groove connected thereto and having the same section as that of the rail 41-d. Reference numeral 49 denotes a coupling fixture for continuously fixing the plural image display devices of the present invention, including holes through which male screw portions of lever type rail screws 50 and 52 which are discussed later, are passed, and a rail guide portion 49-a to be fitted into an inlet portion of the rail 41-d. Reference numeral 50 denotes a lever type rail screw for fixing the coupling fixture 49 to the image display device, having an integration of a lever portion easy to be handled and a male screw 50-a. Reference numeral 51 denotes a rail nut. The coupling fixture using two rail nuts 51 is inserted into the groove-like rail 41-d, with which the male screw 50-a is screwed. The inlet portion of the rail 41-d is sandwiched and fixed between the coupling fixture 49 and the rail nut 51. This structure is the same as that in Embodiment 1. Reference numeral 52 denotes a lever type rail screw arranged at the coupling fixture 49 in a reverse orientation to the lever type rail screw 50. The rail screw 52 has the same shape as that of the lever type rail screw 50, including a male screw portion (not shown). The male screw portion is screwed into the rail 51 (not shown) inserted into the rail 41-d, and the inlet portion of the rail 41-d is sandwiched and fixed between the rail nut 51 and the coupling fixture 49. The rail 41-d is formed in the whole sides of the image display device, so that the plural image display devices can be vertically or horizontally arranged so as to face the rails 41-d. The rail nut 51 is inserted from the nut insertion portion 48-a, the lever type rail screws 50 and 52 are screwed into the rail nut 51 via the coupling fixture 49 to fix the rails 41-d to each other. Therefore, a multi-screen type image display device as depicted in FIG. 12 can be constructed. While the four image display devices are arranged in the present embodiment, the indefinite number of image display devices can theoretically be connected to one another.

Figure 14:
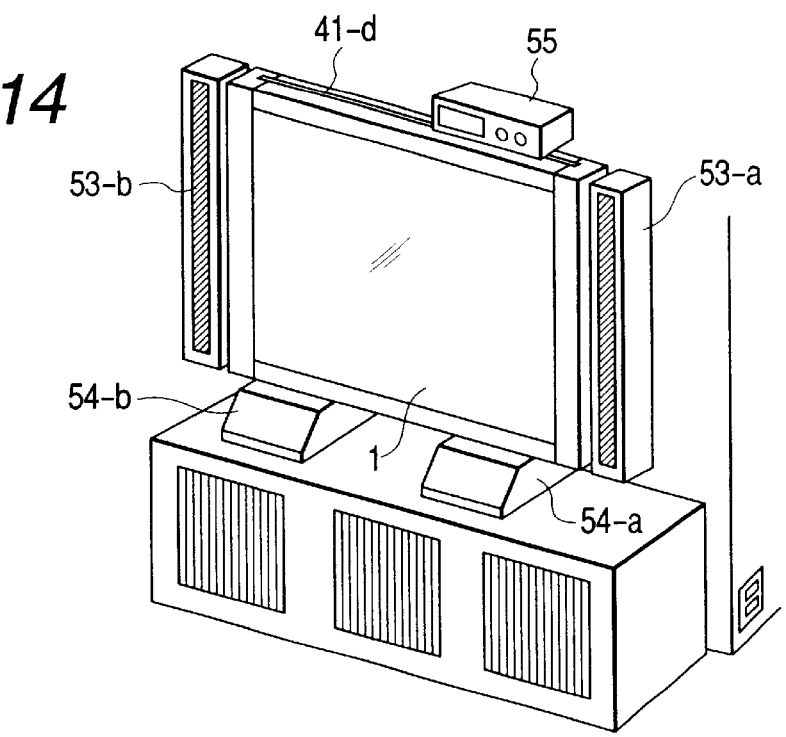
FIG. 14 is an external view showing the structure of an external unit, which illustrates the features of the second embodiment in accordance with the present invention.
Figure 15:
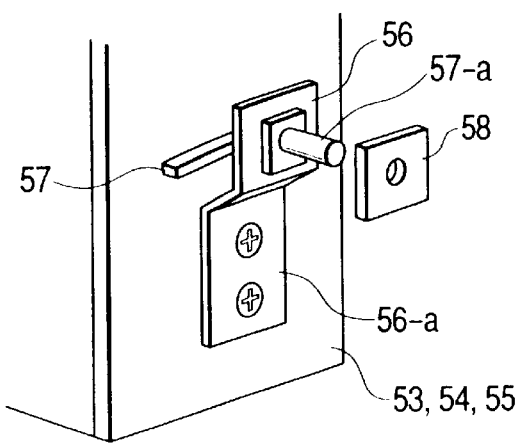
FIG. 15 is an enlarged view of an external unit attaching means, which illustrates the features of the second embodiment in accordance with the present invention.

Now, the structure and method of mounting the attachment unit to the image display device will be described. FIG. 14 is an external view showing that an external unit is assembled with the image display device using the attaching fixture of the present invention. Reference numerals 53-a and 53-b denote a right speaker unit and a left speaker unit, respectively. These speaker units 53-a and 53-b each have a built-in speaker for outputting sound of the image display device, and are arranged rightward and leftward, respectively, to improve live sound. Reference numerals 54-a and 54-b denote a right stand unit and a left stand unit, respectively, arranged lower than display panel 1 for supporting the weight of the entire image display device. These units are used to place the image display device on a base or shelf without hanging on the wall. Reference numeral 55 denotes a communication unit having a built-in input/output communication means to/from the external to the image display device, having a built-in circuit for inputting a signal such as a personal computer signal, television program information service, literal broadcasting, Hi-vision broadcasting, satellite broadcasting or CATV or a circuit for converting a signal to the image display device. FIG. 15 is an enlarged external view showing the structure of the attaching fixture shown in FIG. 14, illustrating how the right speaker unit 53-a, the left speaker unit 53-b, the right stand unit 54-a, the left stand unit 54-b, and the communication unit 55 are assembled with the image display device. Reference numeral 56 denotes a unit attaching fixture to be positively fixed to the housing of the respective units using screws at the fixing portion of a unit attaching fixture 56-a. Reference numeral 57 denotes a lever type rail screw for fixing the unit attaching fixture 56 to the image display device, having an integration of a lever portion easy to be handled and a male screw 57-a. Reference numeral 58 denotes a rail nut. The coupling fixture using two rail nuts 58 is inserted into the groove-like rail 41-d, with which the male screw 57-a is screwed. Reference numeral 58 denotes a main body side rail screw used for the unit attaching fixture 56, which is inserted from the nut insertion portion 48-a into the groove-shaped rail 41-d in the outer circumferential surface of the image display device to screw the male screw 57-a. The inlet portion of the rail 41-d is sandwiched and fixed between the unit insertion portion 48-a and the main body side rail nut 58. This structure is the same as that in Embodiment 1. With the foregoing structure, the external unit required by a user can be engaged/disengaged with/from the outer circumferential portion of the image display device. Although not shown in the present embodiment, applied use can be enhanced such that a woofer speaker unit may be suspended from the lower central portion, or otherwise any new signal input means may be added.

[Embodiment 3]

Figure 16A:
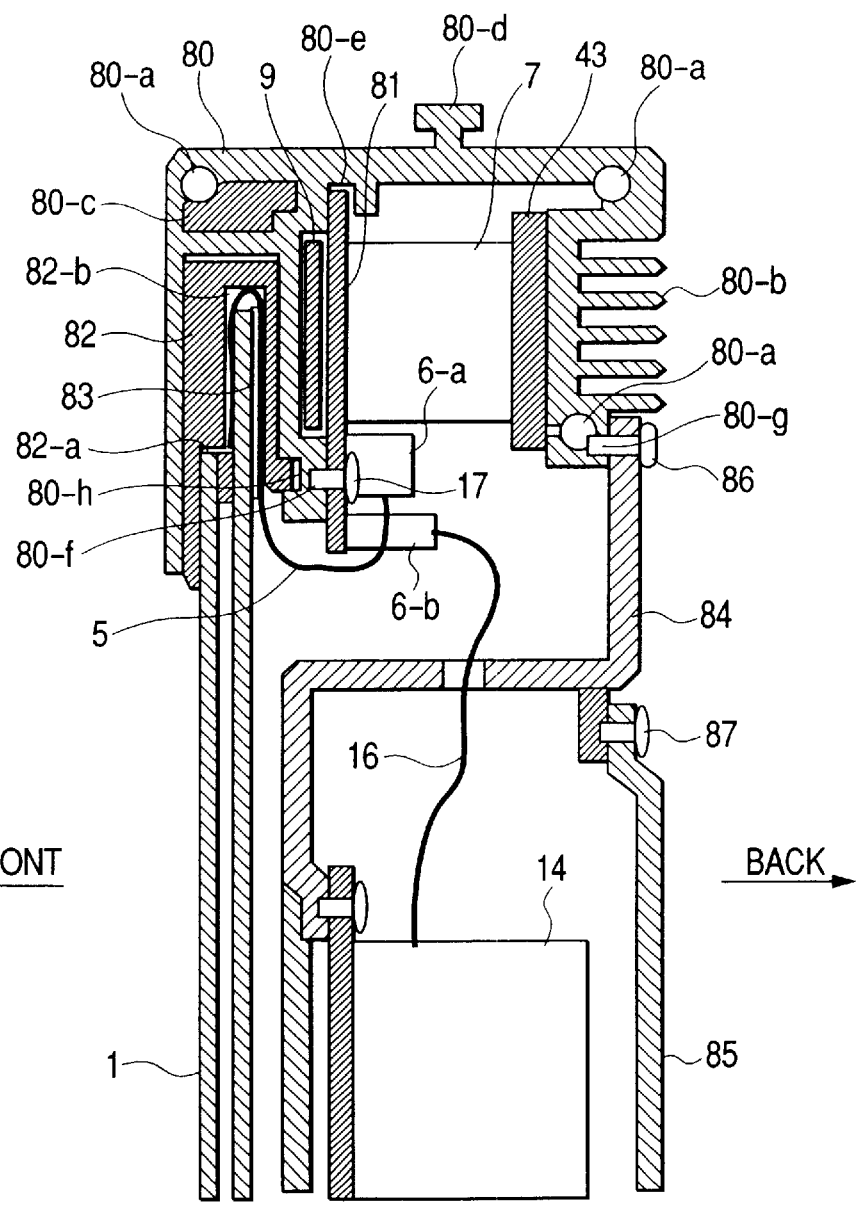
FIG. 16A is a vertical sectional view, which illustrates the features of a third embodiment in accordance with the present invention.
Figure 16B:
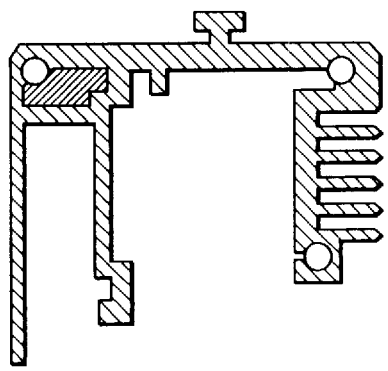
FIG. 16B is a longitudinal sectional view of one frame side.
Figure 17:
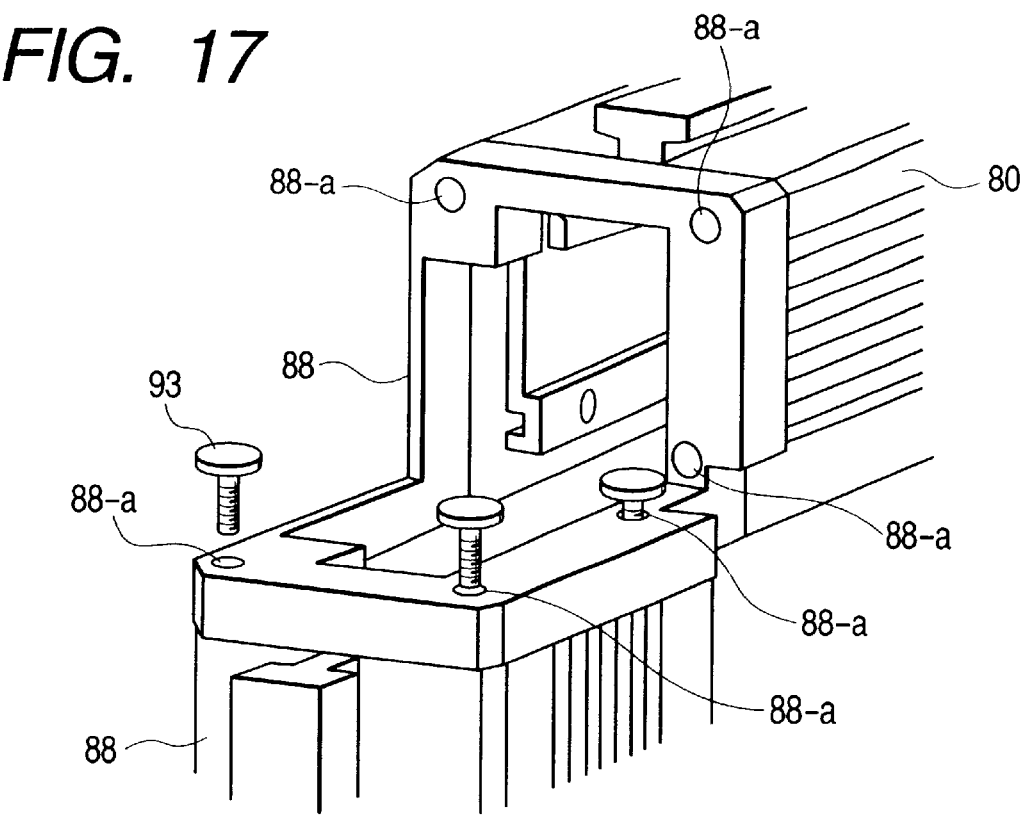
FIG. 17 is an enlarged view of a frame fixing member, which illustrates the features of the third embodiment in accordance with the present invention.

FIG. 16A is a longitudinal sectional view, which most illustrates the feature in accordance with a third embodiment of the present invention, taken along an area of FIG. 1 according to Embodiment 1. FIG. 16B is also a longitudinal sectional view in longitudinal section taken along an area A with built-in components omitted. FIG. 17 is an external view showing a frame fixing member. Throughout the figures, the same reference numerals represent the same parts or the same components in Embodiment 1, omitting their description. In FIG. 17, reference numeral 80 denotes a supporting frame shaped into substantially an E-shaped in section on which continuous holes or ribs are formed by the extrusion machining and the resultant material is cut into a predetermined length, and then their ends are connected via a separate member to assemble a casing. The supporting frame is made of metal such as aluminum alloy or magnesium alloy so that the formation coating process and resin painting are performed on their exterior surfaces and the formation coating process and black coating are performed on their inner surfaces. Reference numeral 80-a denotes a female screw hole of the supporting frame which is used to assemble the outer frame into a casing. Reference numeral 80-b denotes heat releasing fins, which are sequentially formed in the supporting frame 80. Reference numeral 80-c denotes supporting frame hollow portions, which are sequentially formed by the extrusion machining at the corner portion of the supporting frame 80. Reference numeral 80-d denotes a rail for mounting a coupling fixture 90 described later in an arbitrary position. Reference numeral 80-e denotes a positioning electric board (Y-driver board) insertion portion continuously formed on the supporting frame. Reference numerals 80-f and 80-g denote supporting frame female screw holes that are formed by the extrusion machining followed by the secondary machining such as cut-machining or press-machining. Reference numeral 80-h denotes a positioning groove of the supporting frame sequentially fabricated by the extrusion machining, which is shaped so as to be engaged with a convex portion of a buffer 82 described later. Reference numeral 81 denotes a Y-driver board on which the Y-driver electric circuit 7 for generating an electric drive signal for image display or Y-driver output connector 6-a, Y-driver input connector 6-b or other electric devices (not shown) are mounted, including a circuit pattern (not shown) on its surface. The Y-driver board is positioned by the supporting frame insertion portion 80-*e*, and fixed to the inside of the supporting frame 80 by the Y-driver board fixing screw 17. As is similar to that in Embodiment 2, an adhesive layer is tightly adhered to the thermal conductive material 43 having an adhesive material layer formed on one surface, which is tightly adhered to the Y-driver electric circuit 7. The other side of this material is tightly adhered to the inner wall of the supporting frame 80. Reference numeral 82 denotes a buffer arranged to cover the circumferential portion of the rear glass plate and the front glass plate of the display panel 1 with substantially square U-shape. The buffer is positioned by a positioning groove 80-*h* of the supporting frame 80, attaining to prevent damage of the glass plate and to absorb shock affected from the external on the entire display panel 1. The display panel 1 is positioned by level difference 82-*a*. It is assumed that the buffer 82 be made of urethane rubber or silicon rubber with a thickness of about 3 mm in average with the rubber hardness of 70 to 90. Reference numeral 82-*b* denotes a clearance portion comprising space for protecting the portion where the Y-driver output cable 5 is bent. Reference numeral 83 denotes a buffer sheet held between the display panel 1 and the Y-driver output cable 5, attaining to prevent damage of the Y-driver output cable 5, which is made of urethane rubber or silicon rubber with a thickness of about 1 mm or less. The foregoing structure is common to the hatched portion of FIG. 2C according to Embodiment 1 and the upper/lower/right/left edge portions of the image display device (but the electric board at the right and left edges includes the X-driver electric circuit 21 thereon). Reference numeral 84 denotes a middle frame using an aluminum material fabricated by the press-machining. The middle frame is located inside the casing constituted by the supporting frame 80, including a passing portion of the connection cable 16 or the signal processing circuit 14. A middle frame fixing screw 86 is used to tightly fix the middle frame to the female screw hole 80-*g* portion of the supporting frame. Reference numeral 85 denotes a back cover using an aluminum material fabricated by the press-machining. The back cover is located in the vicinity of the center of the middle frame 84, and intended to protect mounted portions (not shown) represented by the signal processing circuit 14. A back cover fixing screw 87 is used to tightly fix the back cover to a portion where the middle frame 84 is bent. Reference numeral 88 denotes a supporting frame fixing member arranged at the four corners of the image display device such that the ends of the supporting frame 80 arranged at the upper/lower/right/left portions is fixed by fixing screws 93 to form a casing. The supporting frame fixing member is made of an aluminum material or a magnesium material fabricated by the diecasting machine, and is provided with six fixing screw insertion portions 88-*a*. A cosmetic cover 89 is also fitted into the outside of the supporting frame fixing member 88, as in Embodiment 1.

Now, the characteristic operation and structure of the foregoing arrangement will be further described. The Y-driver electric circuit 7 or the X-driver electric circuit 21 (as in Embodiment 1, not shown) incorporated into the image display device has large screen size and a great number of channels, resulting in high capacity of current with high heat generation. If the generated heat is not efficiently radiated to the outside, the electric devices themselves in that circuit may malfunction. In the structure according to the present invention, for example, the heat generated by the Y-driver electric circuit 7 is transmitted to the thermal conductive member 43, which is further transmitted to the inner wall of the supporting frame 80, and then radiated to the air external to the housing from the heat releasing fins 80-*d*. The thermal conductive member 43 employed in the present invention has the same material as that in Embodiment 2, omitting the description. The supporting frame 80 is made of aluminum alloy or magnesium alloy excellent in heat conductivity, so that heat can be efficiently transmitted from the inner wall to the heat releasing fins 80-*b*. The vicinity of the right and left X-driver electric circuits 21 (not shown) also has such features.

According to the supporting structure of the display panel 1, as described above, the perimeter of the display panel 1 is covered with a buffer that has a shape approximate to squared U and is arranged in the groove portion in the supporting frame 80 forming a frame. With this, the display panel 1 is positioned and supported without fail. Furthermore, the buffer effect owing to the material and the thickness of the buffer 82 absorbs inflation-deflation difference between the display panel 1 and the supporting frame 80 forming a frame which is caused by temperature change in surroundings, as well as it absorbs breakage of the glass plate due to the load impart on the display panel 1 or a shock and vibration externally given during transportation and handling of the product. The supporting frame 80 has a sectional shape approximate to letter E and has a hollow portion at a corner in section, giving its material a fair solidity for its light weight. The supporting frame 80 also shows excellent solidity when assembled into a frame, for each junction of two sides of the frame has the supporting frame fixing member 88 that is made of a rigid die-cast metal and is securely fixed with a plurality of fixing screws 94. Therefore, stress is not applied on the display panel 1 if an external force is given on this image display device during its transportation and handling. Incidentally, the present invention is designed on the assumption that the average thickness of the frames is about 1.5 mm for the case of aluminum frames, and about 1.9 mm for the case of magnesium frames. It should also be note that, since metal frames have a high conductivity, the whole frame constructed of the supporting frame 80 and the supporting frame fixing member 88 becomes electric GND to obtain high shielding property against electromagnetic wave by wiring the GND lines on the Y driver board 81 and other circuit patterns to the fixing screw insertion portion. In comparison with the aforementioned embodiments, one frame is used to support the image display portion 1 in this embodiment. Another essential point of the image display device of this embodiment is that every frame is molded by extrusion machining. This is similar to Embodiment 1 and therefore the explanation is omitted.

Figure 18:
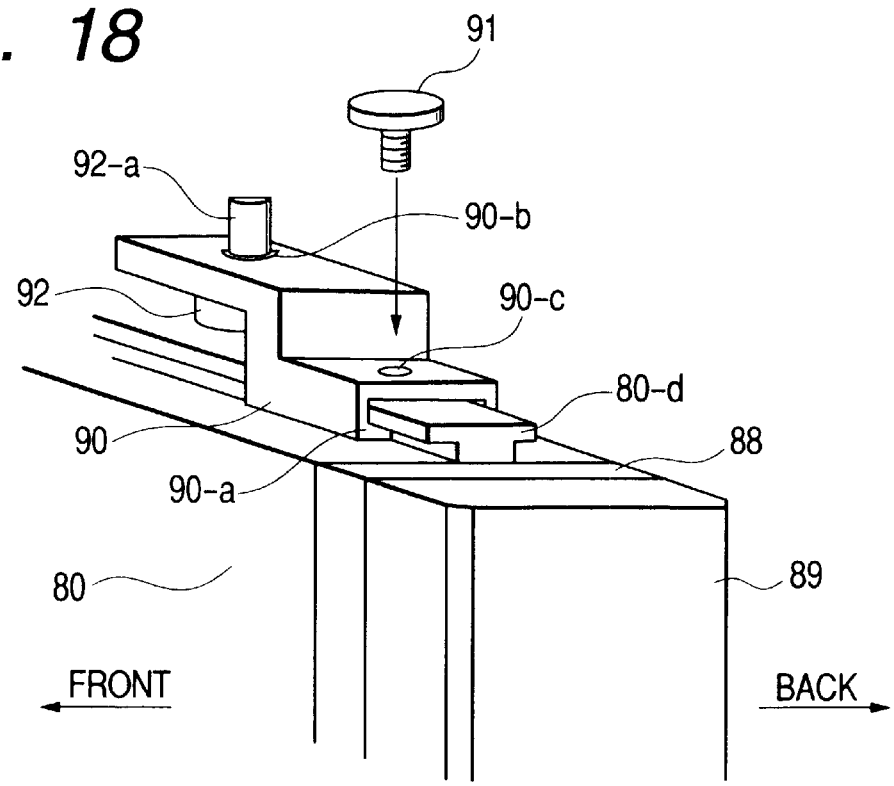
FIG. 18 is an enlarged view showing a side surface coupling means, which illustrates the features of the third embodiment in accordance with the present invention.
Figure 19:
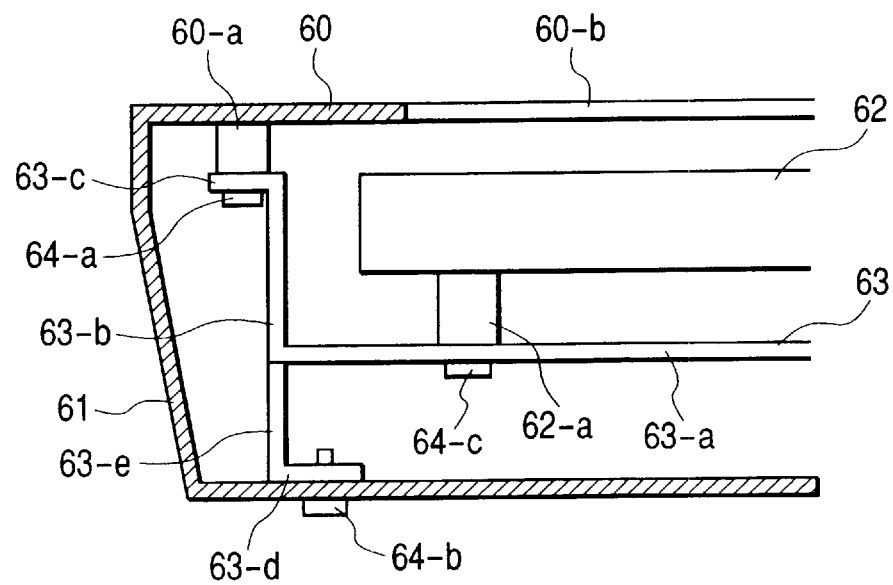
FIG. 19 is a transverse sectional view of a PDP in the prior art.
Figure 20:
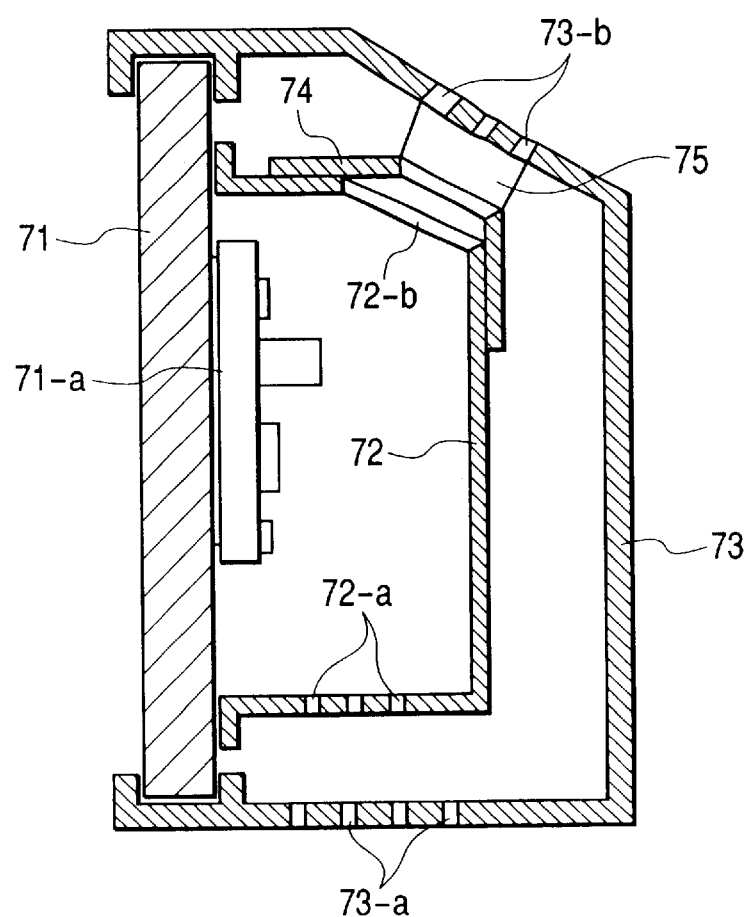
FIG. 20 is a vertical sectional view of a PDP in the prior art.

Next, a description will be given on the structure and characteristics of the linear convex rail arranged on the side face circumference of this image display device. FIG. 18 is an enlarged view showing the coupling fitting of the present invention is arranged in the rail on the side face. In the figure, reference numeral 90 denotes a coupling fitting for coupling a plurality of image display devices and for attaching an external unit as explained in Embodiment 2. The coupling fitting 90 comprises: a convex portion 90-*a* that is engaged with, at their lower faces, the left and right convex portions of the rail 80-*d* in the supporting frame; a through-hole 90-*b* pierced by a setscrew 92 described later; and a female screw hole 90-*c* through which a rail screw 91 described later is to be screwed. The rail screw 91 consists of a grip portion subjected to knurling and having a large diameter, and a male screw portion having a small diameter.

The male screw portion is screwed into the female screw hole 90-*c* of the coupling fitting 90, piercing through the coupling fitting 90 until it abuts against the surface of the rail 80-*d* in the supporting frame. The rail screw 91 is further screwed in so that the left and right convex portions of the rail 80-*d* in the supporting frame is sandwiched and fixed between the tip of the male screw portion and the convex portion 90-*a* of the coupling fitting. The setscrew 92 consists of a grip portion subjected to knurling and having a large diameter, and a male screw portion 92-*a* having a small diameter. The setscrew 92 is screwed through the through-hole 90-*c* of the coupling fitting into a female screw hole (not shown) formed in an external unit to be attached, thereby fixedly attaching the external unit to the coupling fitting 90. Thus in this embodiment, the coupling (attaching) is possible if the image display device and an external unit to be attached each have a female screw that fits to the male screw 92-*a* of the setscrew. In addition, the rail 80-*d* extends over the entire side face circumference of this image display device, so that the external unit and the image display device can be fixed at a position a user desires. The wall-hanging means may of course be made using the L-shaped angle member, which is explained in Embodiment 2.

As described above, the invention realizes a supporting structure that reduces the frame border size of the front cover (outer frame) and is thin but yet is solid. Thus the supporting structure dynamically protects the thin planar display panel from an externally given vibration and shock, and from an external load impart during transportation and upon the time of handling. The heat releasing structure consisting of a thermal conductive material and a metal cover (inner frame) effectively release heat generated in the driver electric circuit, which is large in heat value, to the outside, eliminating the need for any air circulation clearance and cooling fan to thereby accomplish extreme thinning and lowering of noise level. The reduction in frame border size, the thinning of the device and the riddance of the cooling fan can help reducing the weight of the whole device and lowering the power consumption, further enhancing the attraction of the invention as a product. The inner wall is curved to prevent breakage of the cable and a structure for insulating from the wiring cable and the electric device, improving the reliability and the safety of the product. The electric GND is adopted for the exterior components enhancing the shielding property against electromagnetic wave. When the image display device is set on the wall, wall-hanging means can be fixed at any desired point on the entire circumference of the outer frame side face. Thus, limitation on the position to fix the device is eliminated to increase the attraction of the product. It is also possible to couple a plurality of image display devices of the invention with coupling fittings, forming a multi-screen. The coupling fittings may also be utilized to attach external speakers, a communication unit, a stand unit, etc., allowing usage in consistent with user purpose. The adoption of extrusion machining in producing the frames reduces the cost for molds as well as provides a merit of sharing the mold between television sets different in the screen size and the aspect ratio.

The present invention described above can provide a structure for supporting the display panel of the image display device, or a structure for supporting the display panel and the electric circuit unit.

The present invention described above can also provided a structure for cooling a heating portion and a wall-hung structure, in addition to the abovementioned supporting structure.

The present invention described above can reinforce the strength against the panel distortion accompanying enlargement of the display panel, while thinning the housing.

What is claimed is:

1. A planar image display device comprising:
    a planar display panel;
    an image display unit providing an image to be displayed on said display panel, said image display unit including first and second drivers for generating an electric signal for the image display; and
    a housing that includes i) a frame body with four sides and a front portion and arranged on a circumference of said display panel and ii) a back cover arranged behind said display panel and positioned at a rear portion of said frame body, wherein
    said frame body has a structure for sandwiching said display panel within its four sides, and one of said drivers is supported within said frame body.

2. A planar image display device according to claim 1, wherein said frame body has a structure in which a plurality of members combined are used to sandwich said display panel.

3. A planar image display device according to claim 1, wherein said frame body is comprised of members that are integrated and have a clearance portion for sandwiching said display panel.

4. A planar image display device according to claim 1, wherein said sandwiching portion of said frame body has an elastic member arranged therein.

5. A planar image display device according to claim 1, wherein said sandwiching portion of said frame body has an elastic member and a groove for positioning said elastic member.

6. A planar image display device according to claim 1, wherein inner wall surfaces of said frame body are curved.

7. A planar image display device according to claim 1, wherein said frame body has means for fixing said back cover.

8. A planar image display device according to claim 1, wherein said frame body is made of an aluminum alloy or a magnesium alloy.

9. A planar image display device according to claim 1, wherein a surface of said frame body is treated with oxidation preventing treatment.

10. A planar image display device according to claim 1, wherein members forming the four sides of said frame body are molded by extrusion machining.

11. A planar image display device according to claim 1, wherein said frame body has a space therein, and further comprising a drive controlling electric circuit unit arranged within the space.

12. A planar image display device according to claim 1, further comprising a heat releasing unit for releasing heat generated by said image display unit, wherein said heat releasing unit is disposed in said frame body.

13. A planar image display device according to claim 5, wherein said elastic member has level difference for positioning said display panel.

14. A planar image display device according to claim 11, wherein said drive controlling electric circuit unit is connected to another drive controlling electric circuit unit that is arranged outside the space.

15. A planar image display device according to claim 11, wherein said frame body has heat releasing means on its outside.

16. A planar image display device according to claim 11, wherein said frame body has heat absorbing means on inner walls of the space.

17. A planar image display device according to claim 11, wherein said heat absorbing means is arranged in close contact with said drive controlling electric circuit unit.

18. A planar image display device according to claim 11, wherein said drive controlling electric circuit unit is comprised of circuit substrates, cables and electric devices.

19. A planar image display device according to claim 17, further comprising a thermal conductive member placed between said heat absorbing means and said drive controlling electric circuit unit.

20. A planar image display device according to claim 18, wherein inner walls of said frame body have grooves for positioning said circuit substrates.

21. A planar image display device according to claim 18, wherein an insulating member is placed between inner walls of said frame body and said circuit substrates.

22. A planar image display device comprising:
- a planar display panel;
- an image display unit providing an image to be displayed on said display panel, said image display unit including first and second drivers for generating an electric signal for the image display; and
- a housing that includes i) a frame body with four sides arranged on a circumference of said display panel and ii) a back cover arranged behind said display panel, wherein said frame body has a surface covering portion for partially covering a surface of said display panel, and a supporting portion for supporting with its four sides said display panel, with one of said drivers being supported in said frame body.

23. A planar image display device according to claim 22, wherein said frame body is constructed of a plurality of members including a first member that forms said surface covering portion and a second member forming said supporting portion.

24. A planar image display device according to claim 22, wherein said supporting portion has an adhesion member, which is used to support said display panel.

25. A planar image display device according to claim 22, wherein inner wall surfaces of said frame body are curved.

26. A planar image display device according to claim 22, wherein said frame body has means for fixing said back cover.

27. A planar image display device according to claim 22, wherein said frame body is made of an aluminum alloy or a magnesium alloy.

28. A planar image display device according to claim 22, wherein a surface of said frame body is treated with oxidation preventing treatment.

29. A planar image display device according to claim 22, wherein members forming the four sides of said frame body are molded by extrusion machining.

30. A planar image display device according to claim 22, further comprising a heat releasing unit for releasing heat generated by said image display unit, wherein said heat releasing unit is disposed in said frame body.

31. A planar image display device according to claim 24, wherein said supporting portion has a groove for positioning said adhesion member.

32. A planar image display device comprising:
- a planar display panel;
- an image display unit providing an image to be displayed on said display panel, said image display unit including first and second drivers for generating an electric signal for the image display; and
- a housing covering a circumference and a back of said display panel, wherein a linear groove or a linear convex is formed in said housing, wherein one of said drivers is supported within a circumferential portion of said housing.

33. A planar image display device according to claim 32, wherein the groove or the convex is formed on side wall portions or the back portion of said housing.

34. A planar image display device according to claim 32, wherein said housing has a frame body arranged on the circumference of said display panel and a back cover arranged on the back of said display panel, and wherein the groove or the convex is formed on said frame body.

35. A planar image display device according to claim 32, wherein said frame body has means for fixing said back cover.

36. A planar image display device according to claim 32, wherein said frame body is made of an aluminum alloy or a magnesium alloy.

37. A planar image display device according to claim 32, wherein a surface of said frame body is treated with oxidation preventing treatment.

38. A planar image display device according to claim 32, wherein said frame body includes members forming four sides, with said members being molded by extrusion machining.

39. A planar image display device according to claim 32, further comprising a heat releasing unit for releasing heat generated by said image display unit, wherein said heat releasing unit is disposed in said frame body.

40. An image display device, comprising:
- a supporting frame that is placed along a circumference of a planar display panel and resembles a picture frame, wherein said supporting frame has a hollow frame for supporting a perimeter of said display panel; and
- a drive controlling electric circuit unit for said display device provided inside said hollow frame, wherein
- said hollow frame includes an outer frame and an inner frame, which may be placed at the front and back of a perimeter of said display panel, respectively,
- wherein one of said outer frame and said inner frame has a sectional shape approximate to a squared U while the other has a sectional shape approximate to a letter L, so that said hollow frame has a sectional shape approximate to a rectangle when said outer and inner frames are coupled.

41. An image display device according to claim 40, wherein said hollow frame of said supporting frame is molded by extrusion machining, and wherein ends of said hollow frame are coupled to ends of four sides of said supporting frame at corners.

42. An image display device according to claim 40, wherein said hollow frame of said supporting frame is molded by an extrusion machining, and wherein ends of said hollow frame are directly abutted and joined to ends of four sides of said supporting frame at corners.

43. An image display device according to claim 42, wherein ends of said hollow frame are joined to one another by weld or screws.

44. An image display device, comprising:
- a supporting frame that is placed along a circumference of a display panel and resembles a picture frame, wherein said supporting frame has a hollow frame for supporting the perimeter of said display panel, and wherein a drive controlling electric circuit unit for said display device is provided inside said hollow frame,
- wherein said drive controlling electric circuit unit of said display panel includes circuit substrates, cables and driver devices,
- wherein four sides of said hollow frame of said supporting frame are joined with said other members at corners using screws, wherein said other members at the corners each form a shape approximate to a letter L when viewed from one side of a display panel where an image is to be displayed.

45. An image display device according to claim 44, wherein said display panel is sandwiched, or adhered and supported through an elastic supporting means.

46. An image display device according to claim 40 or 44, further comprising: heat absorbing means provided for an internal heat generating member and formed continuously in a longitudinal direction of said supporting frame; and heat releasing means formed continuously in the same direction as the heat absorbing means.

47. An image display device according to claims 40 or 44 wherein said drive controlling electric circuit unit of said display panel includes circuit substrates, cables and driver devices.

48. An image display device according to claim 40 or 44, wherein said display panel has surface conduction electron-emitting devices.

49. An image display device according to claim 46, wherein said heat absorbing means is constructed of a plurality of projection forms.

50. An image display device according to claim 46, wherein said heat releasing means is constructed of a plurality of projection forms or groove forms, or of a combination of those.

51. An image display device according to claim 47, wherein said hollow frame of said support frame in the vicinity of said cable is curved along said cables.

52. An image display device according to claim 47, wherein said circuit and said driver device mounted thereto are arranged in the vicinity of, or in close contact to, said heat absorbing means.

53. An image display device according to claim 47, wherein a thermal conductive member with elasticity is interposed between said driver device and said heat absorbing means.

54. An image display device according to claim 49, wherein said heat absorbing means is a thin film, a color of which is approximate to black.

55. An image display device according to claim 53, wherein said thermal conductive member is made of a material such as aluminum, carbon and graphite.

56. An image display device according to claim 53, wherein a material of said thermal conductive member is shaped into a sheet, a film or a filler.

57. An image display device according to claim 53, wherein an adhesive member is formed and attached on one side of said thermal conductive member.

\* \* \* \* \*

UNITED STATES PATENT AND TRADEMARK OFFICE
CERTIFICATE OF CORRECTION

PATENT NO. : 6,477,039 B2
DATED : November 5, 2002
INVENTOR(S) : Hisao Tajima

It is certified that error appears in the above-identified patent and that said Letters Patent is hereby corrected as shown below:

Column 3,
Line 54, "most" should be deleted.

Column 10,
Line 3, "is electrically and mechanically con-" should be deleted.
Line 4, "nected on the high voltage source circuit" should be deleted.

Column 16,
Line 4, "in" should be deleted.

Column 17,
Line 45, "Lshaped" should read -- L-shaped --.

Column 18,
Line 52, "though" should read -- through --.

Column 21,
Line 51, "54--*b*denote" should read -- 54-b denote --.

Column 29,
Line 13, "as the" should read -- as said --.

Signed and Sealed this

First Day of July, 2003

JAMES E. ROGAN
*Director of the United States Patent and Trademark Office*